(12) United States Patent
Lehman et al.

(10) Patent No.: US 10,497,063 B2
(45) Date of Patent: *Dec. 3, 2019

(54) MOBILE INSURANCE PLATFORM SYSTEM

(71) Applicant: Progressive Casualty Insurance Company, Mayfield Village, OH (US)

(72) Inventors: Matthew Daniel Lehman, Shaker Heights, OH (US); Bradley Thomas Philips, Akron, OH (US); Pawan Kumar Divakarla, Shaker Heights, OH (US); Toby Kramer Alfred, Orange, OH (US); William Curtis Everett, Chagrin Falls, OH (US); Brian Joseph Surtz, Mentor, OH (US); Raymond Scott Ling, Westlake, OH (US)

(73) Assignee: Progressive Casualty Insurance Company, Mayfield Village, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/916,722

(22) Filed: Mar. 9, 2018

(65) Prior Publication Data
US 2018/0197249 A1 Jul. 12, 2018

Related U.S. Application Data

(63) Continuation of application No. 13/364,953, filed on Feb. 2, 2012, now Pat. No. 9,916,625.

(51) Int. Cl.
*G06Q 40/00* (2012.01)
*G06Q 40/08* (2012.01)
*G06Q 20/32* (2012.01)

(52) U.S. Cl.
CPC .......... *G06Q 40/08* (2013.01); *G06Q 20/322* (2013.01)

(58) Field of Classification Search
CPC ............... G06Q 30/02; G06Q 30/0248; G06Q 30/0255; G06Q 30/0267
See application file for complete search history.

(56) References Cited

U.S. PATENT DOCUMENTS

2004/0039610 A1* 2/2004 Weitermann ........... G06Q 40/08
705/4
2009/0152343 A1* 6/2009 Carter ................ G06Q 10/0633
235/379

(Continued)

OTHER PUBLICATIONS eHealthInsurance Launches Mobile Application to Help Consumers Compare and Apply for Health Insurance Coverage _ eHealth Insurance, , eHealthInsurance, p. 1-2, Sep. 19, 2011 (Year: 2011).*

(Continued)

*Primary Examiner* — Mike Anderson
(74) *Attorney, Agent, or Firm* — Benesch, Friedlander, Coplan & Aronoff LLP

(57) ABSTRACT

A mobile insurance architecture includes a wireless communication interface that connects mobile client devices to wireless networks. An insurance server cluster that includes a group of independent network servers operates and appears to mobile client devices as if the group of independent network servers were a single computer server. An adaptive transmission controller communicates with the insurance server cluster and processes content in multiple mobile formats that may be optimized to the screen sizes of the mobile client devices. The insurance server cluster responds to native application clients resident to the mobile client devices. The native application clients contain code stored on a non-transitory media that render insurance quoting services, insurance claims services, on-line insurance policy services, usage based insurance services, mobile monitoring services, or insurance agency management services.

24 Claims, 17 Drawing Sheets

(56) References Cited

U.S. PATENT DOCUMENTS

| | | | |
|---|---|---|---|
| 2010/0150424 A1* | 6/2010 | Nepomniachtchi | G06K 9/36 382/140 |
| 2010/0174564 A1* | 7/2010 | Stender | G06Q 10/10 705/4 |
| 2010/0280675 A1* | 11/2010 | Tate, Jr. | H01M 10/44 700/295 |
| 2011/0091092 A1* | 4/2011 | Nepomniachtchi | G06K 9/3275 382/139 |
| 2011/0161118 A1* | 6/2011 | Borden | G06Q 40/08 705/4 |
| 2012/0230548 A1* | 9/2012 | Calman | G06K 9/00791 382/104 |
| 2012/0232935 A1* | 9/2012 | Voccola | G06Q 40/08 705/4 |
| 2012/0284058 A1* | 11/2012 | Varanasi | G06Q 10/10 705/4 |
| 2013/0046562 A1* | 2/2013 | Taylor | G06Q 40/00 705/4 |
| 2013/0290036 A1* | 10/2013 | Strange | G06Q 40/08 705/4 |

OTHER PUBLICATIONS

Merriam-Webster, wordframe.com/docs/wiki/server-cluster-definition/, Sep. 5, 2008 (Year: 2008).*

Wordframe, wordframe.com/docs/wiki/server-cluster-definition/, Nov. 24, 2010 (Year: 2010).*

* cited by examiner

Registration

Opening Screen

Registration Screen

Trip Data Collection

Landing Screen

Trip Data being recorded

Trip Data Removal

Remove All Trip Data

Remove All Trip Data

Remove individual trips

US 10,497,063 B2

MOBILE INSURANCE PLATFORM SYSTEM

RELATED APPLICATION

This application is a continuation of application Ser. No. 13/364,953 filed on Feb. 2, 2012, titled "Mobile Insurance System," now U.S. Pat. No. 9,916,625, which is incorporated by reference in its entirety.

BACKGROUND OF THE INVENTION

Technical Field

This disclosure relates to insurance devices, systems, and methods, and more particularly to a mobile architecture that supports mobile applications that may be accessible through or executed by mobile devices.

Related Art

Insurance often requires back-office operations and customer interactions to optimize customer relationships and achieve growth. The operations may require collaboration between insurance representatives and customers to capture new business, service existing business, and resolve insurance issues such as claim handling and fulfillment. The process requires regular communication to service customers and attract new business.

From an insurer's perspective a higher level of communication is required to maintain operational visibility, customer relationships, and support core business processes. Such processes may include the management of distribution channels, commissions, collaboration with insurance agent partners, billing, claim evaluations, payments, and the capture and processing of insurance information. The support needed to generate and deliver insurance products that support these functions and others is not a straight through automated process that may be serviced and sustained by a limited network bandwidth or through one or more general purpose computers. Such functions have yet to be serviced or empowered by a mobile architecture.

SUMMARY

A mobile insurance architecture includes a wireless communication interface that connects mobile client devices to wireless networks. An insurance server cluster that includes a group of independent computer network servers operates and appears to mobile client devices as if the group of independent computer network servers were a single unit. An adaptive transmission controller communicates with the insurance server cluster and processes content in multiple mobile formats that may be optimized to the screen sizes of the mobile client devices. The insurance server cluster responds to native application clients resident to the mobile client devices. The native application clients contain code stored on a non-transitory media that may be executed by a mobile processor to render insurance quoting services, insurance claims services, on-line insurance policy services, usage based insurance services, mobile monitoring services, or insurance agency management services.

Other systems, methods, features, and advantages of the inventions will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

Figure 1:
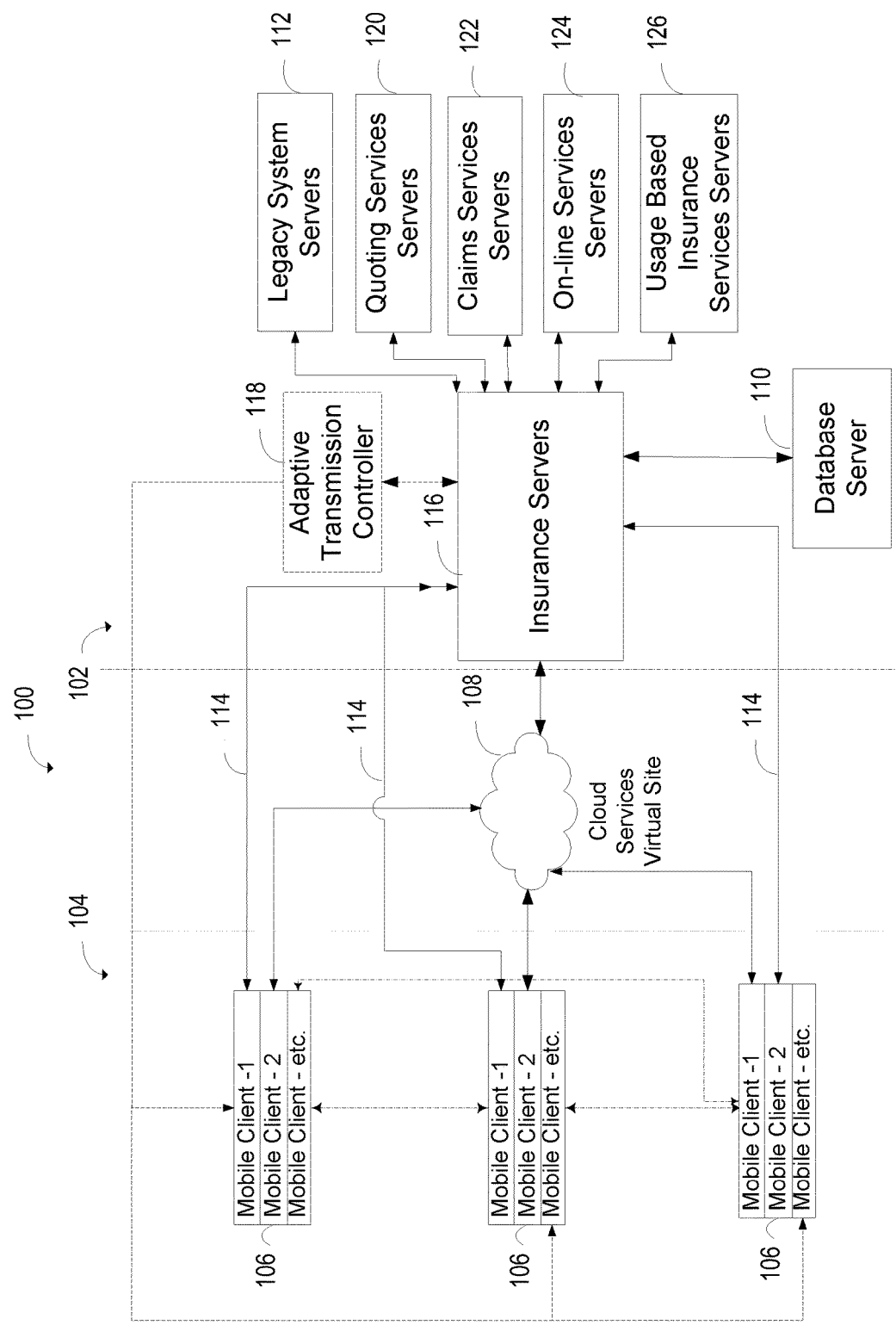
FIG. 1 is a block diagram of an exemplary mobile insurance architecture.

Appendixes 1-21 are exemplary mobile screens that may be rendered in a claim process such as the process shown in part in FIGS. 5-8.

DETAILED DESCRIPTION OF THE PREFERRED EMBODIMENTS

This disclosure provides a mobile insurance architecture that delivers innovative insurance products and high level customer service. The mobile insurance architecture may attain a high level market and operational visibility while supporting core business processes of the insurance industry. The architecture may include and/or support distribution channel management, insurance agent collaboration, customer and claimant direct service, and the capture of new insurance business.

As a multi-user architecture, the operations and functions described herein may be provided after a mobile user's authentication. Access may be granted through processes that validate a mobile user's logon information through passwords and user names, through biometrics, facial recognition (e.g., that may analyze feature locations through weighted difference maps), etc., for example, that may be executed locally on the mobile devices, through a distributed process shared between the mobile device and insurer's side, or in a combination of distributed processes executed locally and across a communication network.

From a claims processing perspective, the mobile insurance architecture facilitates the initiation and capture of claim information, facilitates the evaluation of claims, facilitates the communication of claim status (e.g., where the claim or insured item is in the evaluation or repair process, provide photos, video, real-time or delayed video relating to status, such as the status of a repair) and integrates access to service providers (e.g., repair centers, rental services, etc.) via one or more insurance servers and/or claims services servers. The claiming functionality may further support insurance agent referrals, roadside assistance, and/or the disbursement of payments to the mobile users through one or more servers.

From a quoting perspective the architecture may include and/or support a fully or partially automated customized point-of-sale application that supports insurance quotes, insurance related sales, and insurance services at any time and in any place (e.g., 24 hours a day, 7 days a week). The quoting, buying, and claiming architecture may provide direct access to telephone call centers and provide contextual screening, contextual interrogation, and/or contextual queries based on the unique information gathered from the user's own mobile applications resident to the user's mobile device. Such information may be supplemented or gathered automatically through one, two, three or more sensors built into the user's mobile device and software routines, such as a camera that may be a unitary part of or integrated to the mobile device, and optical character recognition (OCR) software.

Some quoting and claiming architectures may facilitate automated requests made and transmitted by the mobile device itself and may program the mobile device to make decisions on its own, such as transmitting requests to any destination, including remote analytic services, government services, data warehouses, local or remote databases, and/or third party vendors upon the occurrence of an event. The architecture may also include or support the automatic prefilling of forms, such as electronic forms, without requiring users to manually enter or re-enter information. A text-to-speech engine and/or speech-to-text engine may further solicit and capture information with little user effort. Through an aural contextual query, written contextual query, graphical query, static query, query screen, or user inquiry session (each of which may be interactive) the mobile architecture may streamline one or more insurance application processes, service processes, claim handling and fulfillment processes, collection and disbursement processes, etc. The architecture increases productivity and service offerings in insurance shopping, customer servicing, claim handling and fulfillment, insurance agent services, contextual screening, customer referrals, product offerings (e.g., product bundles such as home insurance, vehicle insurance, recreational vehicle insurance, etc.), fraud prevention, etc.

FIG. 1 shows a mobile insurance architecture 100 that supports a mobile user and one or more insurance providers or insurance intermediaries. The insurance providers or insurance intermediaries (referred to as "insurer's side" or "back end" 102) may comprise one or more servers (e.g., computers that respond to commands from a client device) or proxy servers that operate and appear to the mobile client side 104 as a single server. The clustering of the insurer's side or back end 102 improves capacity by, among other things, enabling the devices or computer servers in the cluster to shift work to balance loads. The mobile insurance architecture 100 may enable one or more devices or servers to take over for another, to enhance network stability and minimize or eliminate downtime caused by application or system failure.

The mobile client side 104 and insurance back-end 102 may include one or more components or modules that may be implemented in software, hardware, or a combination of software and hardware. The system may enable the transmission and reception of any type or combination of information including data, video, and audio sent exclusively through the air or through a combination of a wireless medium and a tangible medium (e.g., conductive mediums, optical mediums, etc.). Some mobile client devices 106 interface, are integrated to, or are a unitary part of wireless communication devices, such as cell phones, wireless phones, personal digital assistants, two-way pagers, smartphones, portable computers, vehicle based devices, or other such devices that include one, two, three or more processors such as portable processors (e.g., central processing units, digital processing units, graphical processing units, etc.) that interface a local storage device or virtual (or remote) storage resources such as on-line cloud storage resources 108. The on-line cloud storage resources 108 or local or remote storage device may include nonvolatile memory (e.g., memory cards, flash drives, solid-state devices, ROM/PROM/EPROM/EEPROM, etc.), volatile memory (e.g., RAM/DRAM, etc.), that may retain a database or are part of database server(s) 110 or cluster (shown on the insurer's side 102, but may also serve the mobile client side 104 and/or the network side exclusively or in combination) that retains data in a database structure and supports a database sublanguage (e.g., structured query language, for example) that may be used for querying, updating, and managing data stored in a local or distributed memory of the databases. The database is accessible through database engine or a software interface between the database and user that handles user requests for database actions and controls database security and data integrity requirements. The mobile device 106 may be further configured to communicate with or through one or more tangible devices, such as a personal computer, a laptop computer, a set-top box, a customized computer system such as a game console, and other devices, for example.

Some mobile devices 106 include one or more standalone or integrated/unitary native application clients stored on a non-transitory media (shown as Mobile Client-1, Mobile Client-2, Mobile Client-etc. in FIG. 1), including an insurance shopping client, a claims application client, a customer service client, a usage based insurance client, and a monitoring client. Each of the native application clients may be resident to and executed by one or more mobile device 106 processors. The native application clients may be remote from the insurer's side 102 and may request services provided by other programs run on the quoting services server(s) 120, claims services server(s) 122, on-line services server(s), usage based insurance services server(s) 126, legacy systems server(s) 112, storage resources, and other servers that may comprise, are a part of, or interface the insurer's back end 102. A server may comprise a program or a programmed computer, for example, that responds to commands from a client such as a mobile device. The native application clients may take advantage of the particular mobile device 106 functions, features, and built-in (or accessible) sensors and devices, such as global positioning sensors and services, accelerometers, gyroscopes, cameras, temperature sensors, humidity sensors, altimeter sensors, proximity sensors, etc. The native application clients may offer a superior experience to desktop Web browsing and mobile Web browsing because native application clients are not run within a Web browser, the native application client's fast performance, their well-designed interfaces, and their ability to navigate portions of the applications content without Internet or network connectivity and/or the need to access a browser cache.

The interface 114 linking the native application clients on the mobile devices 106 to the insurer's side 102 may convey commands and information or data between the mobile device side 104 and the insurer's side 102, such as notifications, sharing, uploading, downloading, importing etc. The commands and data that are exchanged between the mobile device side 104 and the insurer's side 102 may be processed without the originating side "knowing" any of the working details or resources provided by the receiving hardware, software, or the resources themselves (e.g., its device/server agnostic). The communication may occur through an extensible markup language (XML), hypertext markup language (HTML), applets, etc. that may include the ability to change and update content dynamically.

On the mobile side 104, content may be accessible or change in response to mobile based user actions, voice commands, facial recognition, or through native gesture recognition applications. Furthermore, when a version or functionality similar to dynamic XML or HTML is used, rich content may be delivered and user interactivity may be enhanced (scaled up or down) to the mobile device. The underlying protocol may support mobile-side application program interfaces (APIs), facial recognition applications, and/or multi-directional gesture controls that may authenticate a user, confirm a mobile user's activity (e.g., the mobile user is driving) and/or emulate a joystick, a mouse click, a swipe, a zoom-in, a zoom-out, a rotation, the throwing of content from one mobile device 106 to another 106 or between a mobile device 106 and the insurance servers 116 or back end 102, among other functionality through the built-in or interfaced sensors of the mobile device. Facial recognition and/or motion may be detected through local mobile device sensors or remote sensors interfaced to the mobile device 106 that detect sound above the audible range (e.g., ultrasonic sensors) and/or below the audible range with the help of a microphone to track voice. Some mobile devices 106 support one, two, or more optical cameras to detect feature locations of an image (e.g., to recognize a user's presence and facial features), and to track motion through two and/or three dimensional images. Other mobile devices 106 use a combination of the above and/or other sensors to track the mobile user's presence and interaction with the mobile device 106. Some mobile devices 106 may sense a mobile user's entire body or a portion of the mobile user interacting with the mobile device 106 or an insured item. The physical gesture recognition may be supplemented by voice commands that may control the mobile device 106 and its native application clients through a touchless, and in some instances, "no-look" (e.g., without the aid of an optical camera) control.

An optional client-side synchronization object that may interface one or more (or any one or combination) of the mobile device clients may synchronize the delivery of data between the mobile device side 104 and the insurer's side 102. Some synchronization objects may automatically switch between cellular networks and a number of different wireless communication networks, including wireless Internet networks or public networks such as Wi-Fi (e.g., 802.11b/g/n), when a successful network connection is made to another network or an existing connection is dropped. The synchronization object may automatically connect to destinations, nearby devices or networks over a high-performance secure connection, such as a high-performance secure Wi-Fi connection. Some synchronization objects may automatically look, and in some instances, automatically connect to communication networks when connectivity is lost, when a high bandwidth mobile client is active, or a higher priority-designated network is discovered or becomes available. The client-side synchronization processing may allow users to set network priority connections and the network order in which the mobile device 106 accesses them. Some mobile-side synchronization schemes may be implemented with restrictions that limit one or more designated mobile device native application client communications to one or more specific communication networks to facilitate faster processing and limit mobile data consumption. When network connectivity is restricted (by a mobile user, an insurance provider, or intermediary, for example) or when all network connections are lost, or when a dead zone is encountered, the mobile device 106 may delay further processing or delay the further transmission of data to remote destinations until an acceptable communication connection is reestablished, or may buffer data in a local memory resident to the mobile device 106 or buffer the data in virtualized storage resources 108 that are accessible through a wireless or physical media. When an acceptable communication connection is reestablished, data transmission may resume or begin. If data was stored, the data may be transferred or an address of the storage location of the data (e.g., an address or address range, for example) may be communicated to the receiving destination, node, or device.

Some synchronization objects may create or support a mesh based network that allows the mobile devices 106 to communicate with each other (shown by the dash lines interlinking the mobile devices 106 to each other in FIG. 1). In some mobile insurance architectures, some or all of the mobile devices 106 may serve as a node in the mesh communication network and act as an independent router or modem-router, regardless of whether the mobile device 106 is connected to another communication network. Some synchronization objects may facilitate continuous connections and automated reconfiguration around dead, non-functional, or disrupted connections by hopping data from node to node until a destination is reached. In some systems, the automated reconfiguration will include other communication networks. In other architectures, it is limited exclusively to the mobile devices 106. In some systems, the synchronization objects may modify the data that is transmitted from node to node by adding or inserting data to a payload, header, or metadata, for example; reconfiguring payload, header, or metadata; compressing some or all of such data; or executing a combination of processing schemes described, etc. The data may capture dynamic and/or static information about the network, such as the configuration or reconfiguration of the network including its dead zones, its disrupted connections, etc. Mobile device 106 analysis of the added, compressed, or modified data, or analysis at the insurer's side 102, may measure and/or reflect real-time traffic congestion, the physical or operational state of infrastructure (e.g., the state of roads, bridges, landlines, mobile phone network, etc.) among other things, and result in real-time or near real-time mobile notifications transmitted to some or all of the mobile devices 106 that may comprise the mesh network (or non-mesh networks) and other devices outside of the network. While the range and speed of some mesh networks may depend on the concentration, functionality, and performance of the mobile devices 106, the mobile device's 106 potential to sustain communication when some of or the entire mobile phone network and/or landline phone networks are knocked out, such as in areas being served by disaster relief, may be significant.

As shown in FIG. 1, a mobile insurance architecture may include an optional adaptive transmission controller 118 that may process content and video (e.g., mobile content) in multiple mobile versions optimized for different variables, such as screen size, resolution, operating system, and the availability and use of plug-ins (e.g., such as Adobe® Acrobat®). A plug-in may comprise a small software program that plugs into a larger application program retained in a non-transitory media to provide added functionality and/or permit access and execution of files, objects, data, etc. embedded in documents, files, and/or data that may not otherwise be recognized. When a request is received at the insurer's side 102, the adaptive transmission controller 118 may transmit content received from the insurer's server 116 that is formatted to the correct size of the designated mobile device 106. Some adaptive transmission controllers 118 use graphic video chips and graphic processors that are configured to manipulate superfast content, instead of relying on traditional server controls that may rely exclusively on central processing units. Through the use of a parallel processing architecture, some adaptive transmission controllers 118 may deliver faster than real-time encoding and multiple adaptive bit rate outputs, to deliver multiple resolution, and deliver output formats in real-time or near real-time that target a variety of mobile devices 106 and operating platforms including MICROSOFT ADOBE, and APPLE's systems, to name a few. A real-time operation may comprise an operation matching a human's perception of time or a virtual process that is processed at the same rate (or perceived to be at the same rate) as a physical or an external process.

Figure 2:
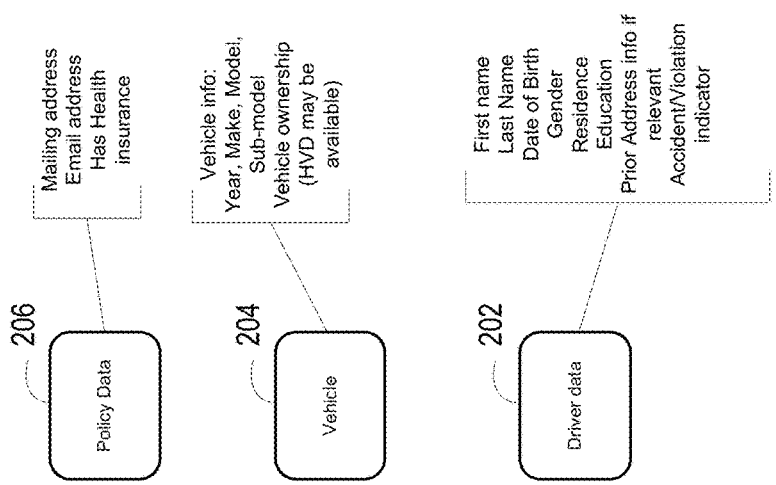
FIG. 2 shows exemplary data collected by a mobile insurance client.
Figure 3:
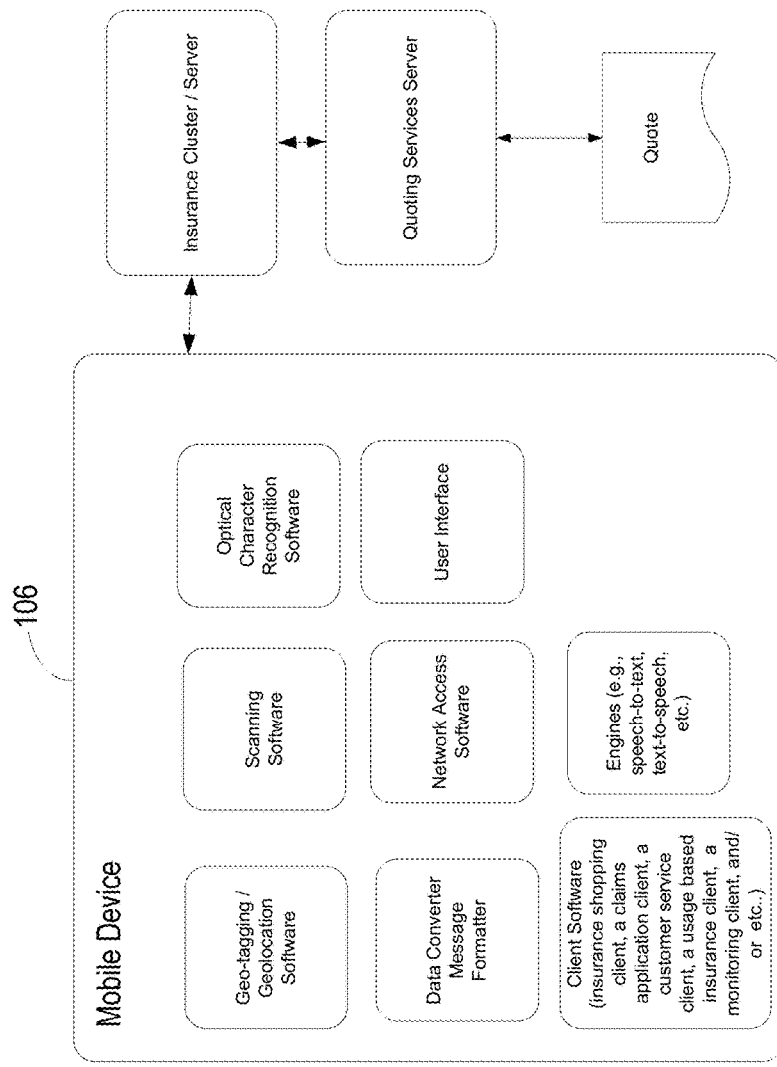
FIG. 3 is a block diagram of an exemplary mobile client device in communication with a quoting services server(s) or server cluster.
Figure 4:
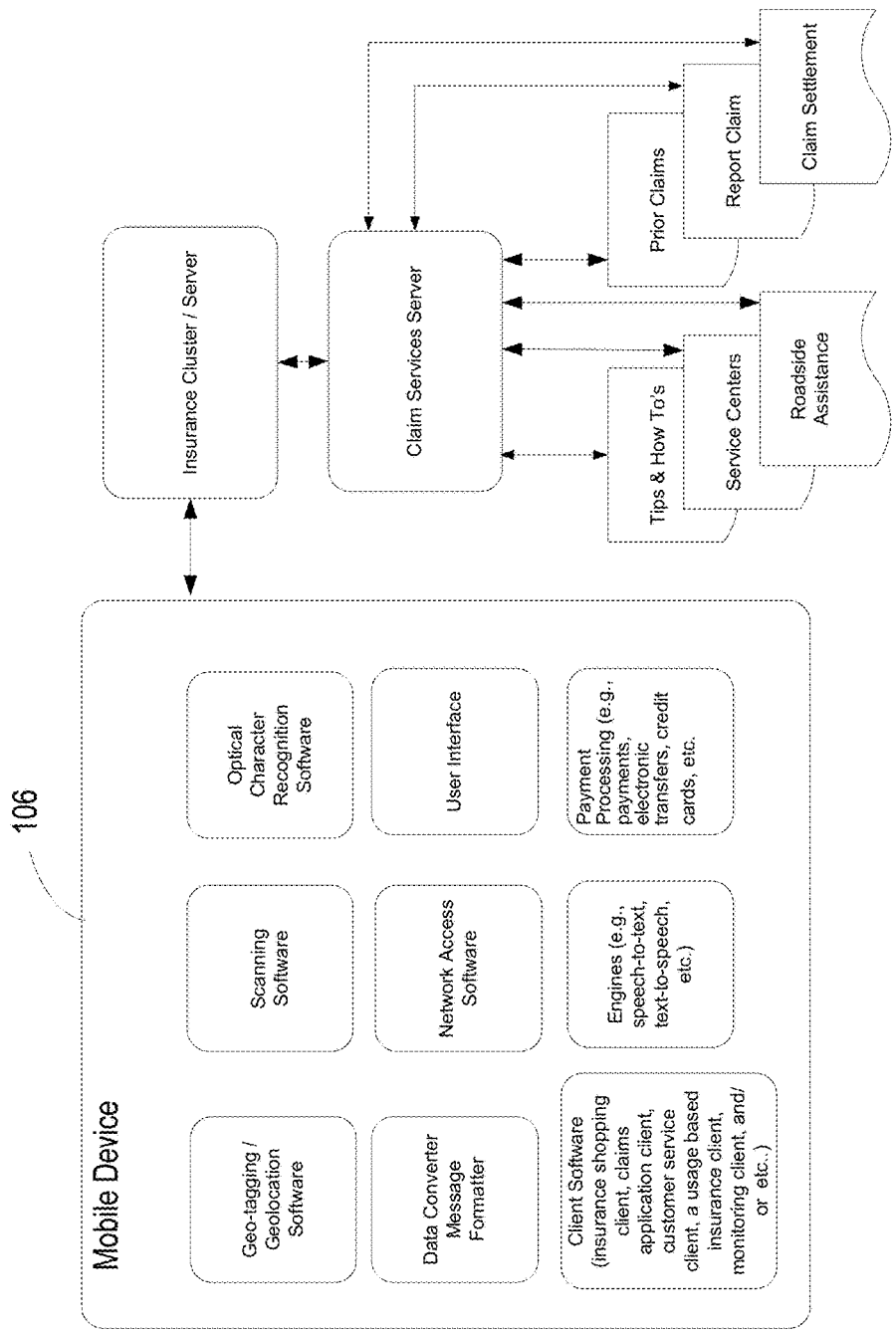
FIG. 4 is a block diagram of an exemplary mobile client device in communication with a claims services server(s) or server cluster.

Referring to FIGS. 2 and 3, a mobile device 106 may include an insurance shopping client that may include multiple objects (e.g., variables that comprise software routines or source code stored in a non-transitory media and in some applications include data that collectively may be treated as discrete programmed hardware or non-transitory hardware modules) to provide fully or partially automated customized point-of-sale applications that support insurance quotes and insurance related sales. The insurance shopping client is responsible for gathering information from prospects and/or existing customers and delivering insurance quotes that may be customizable to the user by premium, plan type, coverages, deductible, effective policy date, etc. For example, one or more insurance parameters may be customized by the user including those described in the Customizable Insurance System pending as U.S. application Ser. No. 12/482,111, which is incorporated herein by reference. Some insurance shopping clients allow prospects and customers to compare plans, rates, and carriers side-by-side (or between mobile screens) twenty-four hours a day seven days a week. In some implementations, the customized and/or competitor quotes may be normalized at the insurance server(s) 116 or insurance server cluster to ensure a consistent comparison (e.g., a statistical normalization that may render similar coverage, policy terms, etc.). The insurance shopping client may render a textual and/or graphical comparison on the mobile device 106 that allows a user to compare coverages, deductibles, rates, insurance carriers, other insurance parameters, and elect insurance plans on one or more mobile screens.

The insurance shopping client may gather the information needed to process quotes, such as the prospect's driver data 202 that may include first name, last name, date of birth, street address, city, state, zip, social security number, gender, vehicle data 204 (that may include year, make, model/sub-model, vehicle identification number or VIN, for example) and/or other data through one or more mobile templates. Such information may also include policy data 206 and may further include information gathered or supplemented automatically through one, two, or more sensors built into the mobile devices 106. Some insurance shopping client objects configure an optical camera of the mobile device 106 into an optical scanner. Mobile OCR and optional geo-tagging software associated with the insurance shopping client objects resident to the mobile device 106 (or in the alternative accessible through a metered service over a network, like the Internet, through cloud computing resources 108, or resident to the insurer's side 102) may translate the identification characters (such as one, two, or three dimensional bar codes such the vertical bars of differing widths if scanning a U.P.C. bar code, such as a Code 39 bar code associated with a VIN, a Quick Response code or Q.R. Code® that may be used in the automotive industry, etc.) and in some systems, the geographical location of the VIN, into a computer/mobile device readable text to a quick-fill object that may automatically prefill or suggest data to prefill one or more mobile templates or may be directly transmitted to the insurer's side 102. Similarly, the optical camera and mobile OCR and optional geo-tagging software may capture or scan driver's license information and deliver that information, and in some systems geographical identification metadata, to a quick-fill object that may automatically prefill or suggest data to prefill one or more mobile templates that are delivered to the insurer's side 102 or in the alternative, may deliver the information directly to the insurer's side 102 as it is entered (e.g., through a persistent connection). In another alternative, the insurance shopping client may automatically gather or harvest information resident to the mobile device 106 itself and other native mobile device clients or mobile web browser applications (e.g., other native software or internet applications that run on cell phones, wireless devices, personal digital assistants, two way pagers, vehicle devices, smartphones, and other mobile devices) that are resident to the mobile device 106 or in network with the mobile device 106. Besides the exemplary driver data 202, vehicle data 204, and policy data 206 described above, personal data, phone information, device identification, usage history, etc., may also be automatically gathered from the mobile device 106 itself and transmitted to the insurer's side 102 during the quoting process.

The information gathering process may solicit different information from prospects based on the information gathered and insurer provided heuristics. Other features available to the insurance shopping client and the other mobile device native application clients (e.g., available to the customer service client, the claims application client, a usage based insurance client, insurance agency management client, and/or the monitoring client) include text-to-speech engines and speech-to-text engines that may solicit, capture, and/or report information or may translate user voice commands. The engines may comprise a processor or portion of a computer program or routine resident to a non-transitory media in the mobile device 106 or accessible through a metered virtual service across a network.

Alternatively, the mobile device 106 may gather some or all of the information automatically. Some insurance shopping client objects may communicate directly with the object that may be the focus of a desired insurance quote, such as a vehicle, for example. Through a personal area network that may include a high level of security, such as a Bluetooth® network (e.g., that may encompass the wireless specification defined by IEEE 802.15, 802.15.4 (TG4), 802.15.3 (TG3), or other standards), for example, the mobile device may communicate directly with the vehicle to capture the vehicle's VIN, and in some systems, supplement the VIN identification data with personal information and/or usage based information resident to the vehicle's powertrain control module, body control module, entertainment and comfort module, and/or other in-vehicle or vehicle interfaced systems and/or other data descriptive or associated with the vehicle. Some mobile devices 106 may automatically identify and then connect with some or all of the original equipment manufacture's communication bus protocols.

Some information gathered in the quoting process may be validated through shared data and mobile device services. For example, shared data and location services (e.g., global positioning sensors, geo-tagging software, etc.) in or available to the mobile device 106, for example, may capture some of the user's demographic information and the user's geographic location (e.g., latitude and longitude) that may be further processed to confirm the user's identity, current address, etc. An address may be confirmed through an address look-up API, through cross-platform requests, comparisons to shared data on the mobile device 106, through requests to other service providers, or through a comparison to data accessible through cloud based services 108.

Figure 17:
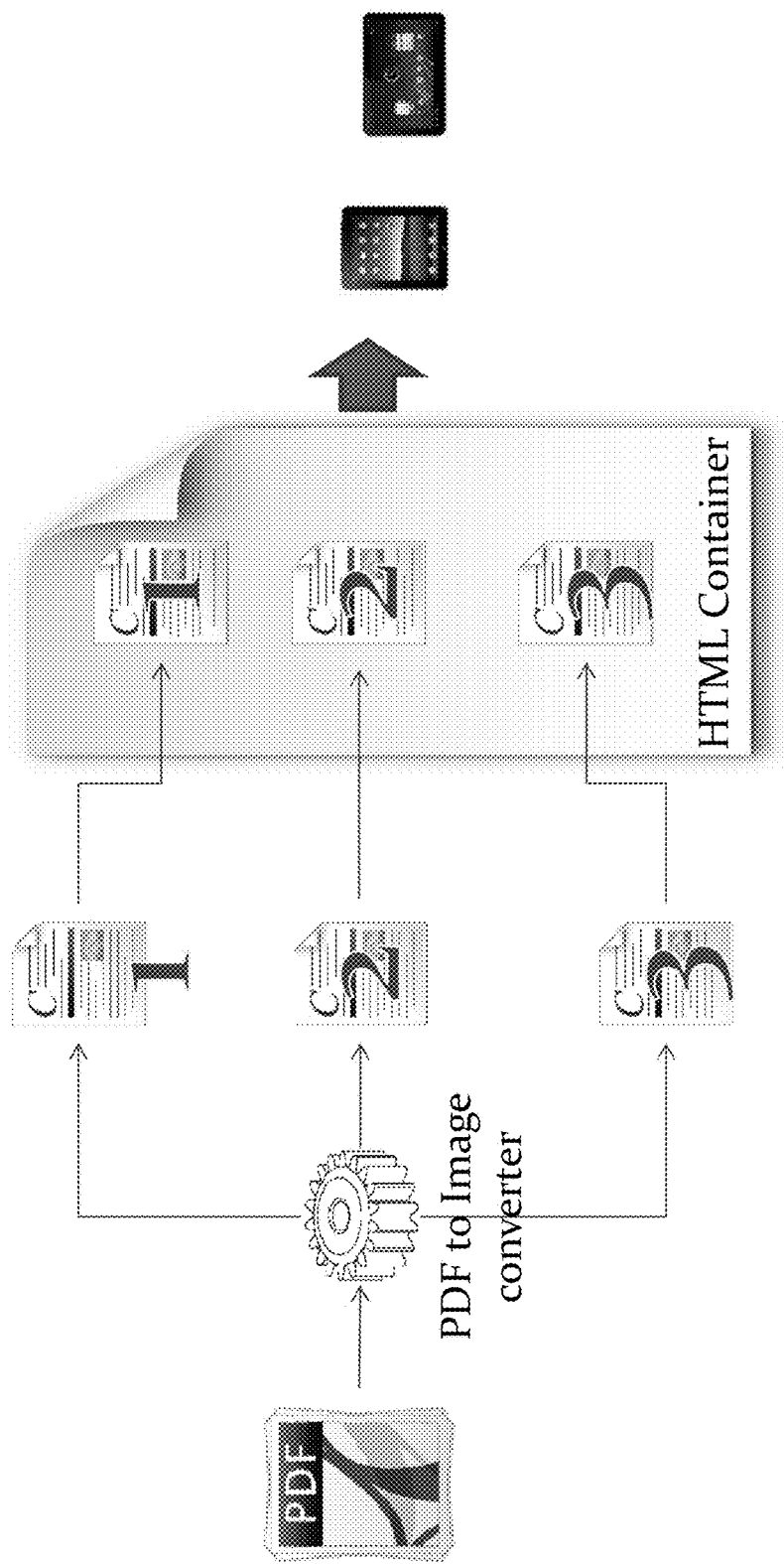
FIG. 17 is an exemplary process that converts a mobile document into a mobile portable image.

Through the above interaction, the insurance shopping client may transmit the information an insurer needs to provide a quote (e.g., to the insurance server(s) and/or quoting services server(s) 120), or in the alternative, make a referral to an insurance agent. Some mobile device data and/or vehicle specific data (e.g., global positioning data, usage based vehicle data, etc.) may also be processed to validate the user transmitted information along with or in addition to data previously entered into or accessible to the insurance provider's system allowing the insurer side 102 to deliver a validated quote to the mobile device 106. The quote may be delivered by the quoting services server(s) 120 through a secure transmission of a path or address of where the quote resides (e.g., a uniform resource locator) via a secure network, a document (e.g., HTML, XML, etc. documents that may be scaled up or down) or file from the insurer' side in real-time or near real-time. To ensure the integrity and/or security of some or all documents delivered to the mobile user, some documents delivered by the insurer's side 102 may be converted into multiple document formats before being delivered through a container—such as a mark-up container, for example—to the mobile devices 106. For example, one or more mobile or electronic documents may be converted into portable document formats (as separate or a common document) and then rendered as an image (or multiple images) before being encapsulated or placed in a container that uses tags (e.g., code or software that identifies an element in a document) to mark elements. Some containers may comprise a Standard Generalized Markup or Hypertext Markup Language container, for example, that is then delivered to a mobile device 106 as shown in FIG. 17.

Acceptance of a quote (e.g., via an acceptance object) may occur in many ways through the mobile device 106. Acceptance may occur by a prospect's acknowledgement, an electronic signature, voice recognition, an accepted gesture, etc. The acknowledgement may be received, encoded, and transmitted with a time and date stamp rendered by the prospect's mobile device 106 or the time and date stamp (a location stamp in some applications that) may be added to the acknowledgment data (e.g., payload, header, metadata) when received at the insurer's side 102 (e.g., insurance server(s) 116). An alternative acceptance object captures, encodes, and transmits to the insurer's side 102 and in some systems displays the actual user's signature via a touch screen on the mobile device 106 that scans user's actual signature via a screen that recognizes a touch or movement in the screen's proximity (e.g., an adjustable nominal distance that in some applications are measured in millimeters), by appending or adding secure signature data or a signature file to the acceptance data, through encryption (e.g., a system that encodes data to prevent unauthorized access such as during transmission of the data to or from the insurer's side 102), or through other means that uniquely identifies the prospect and the prospect's acceptance (e.g., through a user's voice, gesture, etc.). If no hardware keyboard is part of the mobile device 106, the mobile device 106 may render a "soft keyboard" or "virtual keyboard" that may be displayed on the screen when text is desired to be entered in. In some mobile devices 106, the touch screens may accept printing, handwriting, graphics and finger movement, stylus movements that may be captured by many types of screens, such as pressure sensitive screens, capacitive screens, projected capacitive screens, acoustic wave and/or infrared screens, etc. Each of these embodiments and acceptance objects may allow users to sign and/or accept some or all documents, forms, etc. generated by the insurer's side or back-end 102 and/or mobile client side 104 and transmit the acceptance to the insurer's side or back-end 102 and/or mobile client side 102 in real-time, near real-time or after a deliberate delay.

An insurance shopping client may further include one or more insurance shopping client objects that allow prospects to receive a customized quote before purchasing insurance. The customized purchase may comprise a change to an existing insurance policy (e.g., it may include any policy endorsement, any coverage changes, any changes in insurance limits, any changes in insurance deductibles, etc.) or an addition of an insurable item, such as a vehicle, a home, or an addition or change to another insurable item. A prospect may specify the details of the potential insurance purchase through an interface, such as a graphical user interface on the mobile device 106. Information may be solicited through dynamic and/or static verbal, written, and/or gestured control query that may be gathered as described in this disclosure or through other processes that extract data. By example, if the prospect is interested in adding a car to an existing or new insurance policy, the prospect may scan the vehicle's VIN and primary driver's license that may be further processed by geolocation software on the mobile device 106. After selecting or customizing one or more customizable parameters on the mobile device 106 such as a desired premium, plan type, coverages, deductible, effective date, and/or etc., a request may be transmitted to the insured side 102 and a valid quote may be delivered to the mobile device 106 through the quoting services server(s)

120. The valid quote may include conditions, such as a period for acceptance. If adjustments are required, the desired or adjustable parameters may be further modified graphically, textually, etc. by directly entering data or information into the mobile device 106, for example, without reentering the previously entered data or information. Some native insurance shopping clients and/or quoting services server(s) 120 also enable prospects to compare plans, rates, and/or insurance carriers side-by-side (or between mobile screens). A summary may be saved in the mobile device 106, in virtual storage resources such as on-line cloud storage resources 108, or at the insurer's side 102 that may be further accessible through the mobile device's native application clients, a mobile Web browser, a browser-based Web application, or a desktop based Web browser, for example.

A native claims application client facilitates the initiation and capture of claim information, facilitates the evaluation of insurance claims, and provides access to external service providers (e.g., such as appraisers, repair shops, rental service providers, etc.). The claims application client may further support insurance agent referrals, roadside assistance, and the disbursement of payments to the mobile user. The claims application client may also support the dynamic or real-time rendering of mobile insurance identification cards or mobile insurance information cards that may identify the policy number, coverage period, names of the insureds, agent(s) (if applicable), and a description of the insured item (e.g., a vehicle description), for example, on demand via the mobile device 106 and in response to real-time data received form the claims services server(s) 122.

In some mobile devices 106, access—either by simply logging in (via a user name and password), or by identity validation through a facial recognition mobile application—may allow the mobile device 106 to identify some of or all of the details of the insured and/or insured items that are the subject of a claim. Once the insured item or object of the claim is identified, the mobile device 106 may display the insured items or items that may be associated with a user or another claimant. Some mobile devices 106 may access local or remote libraries (e.g., a collection of data and/or programs, routines, subroutines, etc.) to provide descriptions, graphical illustrations, or thumbnail images that may correspond to a possible insured item that is subject to a claim. The descriptions, illustrations, or images may be selected through requests to other server destinations or through an information gathering process. Information may be further gathered through a mobile implementation of a rich claim reporting system, like the systems described in U.S. application Ser. No. 11/803,932, which is herein incorporated by reference.

To gather more information, a fact gathering object may render a dynamic and/or static aural contextual query, written contextual query, graphical query, query screen, or initiate a user inquiry session to fill in one or more mobile templates. The templates may initiate an interactive, real-time, or near real-time interactive exchange with the insurer's side 102 to improve the fact gathering process that may be facilitated by a text-to-speech engine and/or speech-to text engine. The mobile device's 106 sensors and functionality (e.g., sensors that may track velocity, time of day, location, etc., for example) may also allow the mobile user to capture information associated with a claim and quickly report a loss. Some fact-gathering objects configure the mobile device's 106 camera into a scanner. Mobile OCR software and optional geo-tagging software associated with or accessible to the fact gathering objects resident to the mobile device 106 may translate images—and in some systems, the geographical location of a scan—into a mobile device readable text to automatically prefill or suggest data to prefill one or more of the mobile templates, or may directly transmit the images, information, or data to the insurer's side 102. In another alternative, the fact gathering client may gather or harvest information resident to the mobile device 106 itself and other native mobile device clients or mobile web browser applications (e.g., other native software or internet applications that run on smartphones and other mobile devices) that are resident to the mobile device 106 that share data. Besides the insured or claimant's data, insured item data, and policy data, personal data, phone information, device identification, usage history, etc., may also be gathered from the mobile device 106 itself and transmitted to the insurer's side 102 during the claim servicing process. In some instances, the transmission and/or gathering of some or all of the data described herein may be communicated to an immediate response system. The immediate response system may interface with a claim representative or electronically interface with a navigation system (e.g., through geo-location data) and/or insurance response systems that are a unitary part of or interface with a mobile response vehicle, such as an immediate vehicle response vehicle. In some systems, the immediate response system and the in-vehicle system may comprise native applications (such as those described herein) resident to an insurance agent's mobile device or an insurer's representative's mobile device, such as a claim adjuster's mobile device. Some immediate response systems are configured to provide on-the-scene assistance, facilitate a full or partial settlement of claims, and/or facilitate the collection of information and data for claim adjustment purposes.

Some fact gathering objects may gather information or supplement the information gathered automatically. Some fact gathering objects may communicate directly or indirectly with the object of a claim. Through a local network, such as a personal area network that may include a high level of security, for example, the mobile device 106 may communicate directly with the focus of the claim (e.g., such as a vehicle) to capture claim based information. If the object of a claim is a vehicle, for example, the fact gathering object (resident to the mobile device 106) may gather information through a local network and one or more vehicle or in-vehicle systems, such as a vehicle's powertrain control module, body control module, entertainment and/or comfort module, for example, that may capture relevant data (e.g., time of day, location, speed, braking patterns, entertainment and comfort settings, etc.) before or after the occurrence of a loss. The data collected may allow the claims application client to carry out initial checks, trigger automated or manual follow-up processes, and report notice of losses through letters, data exchanges, call centers, wireless network exchanges, cellular network exchanges, Internet exchanges, etc. Some of the data may be fact-checked at the insurer's side 102 via the claims services server(s) 122 and/or mobile client side 104 to clarify the facts related to the claim, validate the policy and claim details, and determine whether the insurer must pay compensation. When fraud is suspected or found, the optional advanced analytics programmed within the mobile device 106 and/or insurance server(s) 116 may identify the suspected claims and route or flag those claim requests or submissions to an automated investigative processes or investigative node coupled to the system. Some mobile devices 106 and/or insurance servers 116 may be further linked via a network to third party insurance industry servers dedicated to identifying fraudulent claims in response to requests received from the mobile client side 104 or the insurance back end 102. The claims application client may also facilitate or complete the settlement of claims (e.g., a payment, a partial or full satisfaction, liquidation, etc.) when enabled by the insurance servers 116 to make payments to the policyholders or claimants, provide replacements for the damaged items, or arrange for the delivery of services by third party providers through the mobile devices 106, and in some applications, without the involvement of insurance personnel such as insurance agents or claims adjusters, for example (e.g., the native claims application client comprises a turnkey system).

Figure 5:
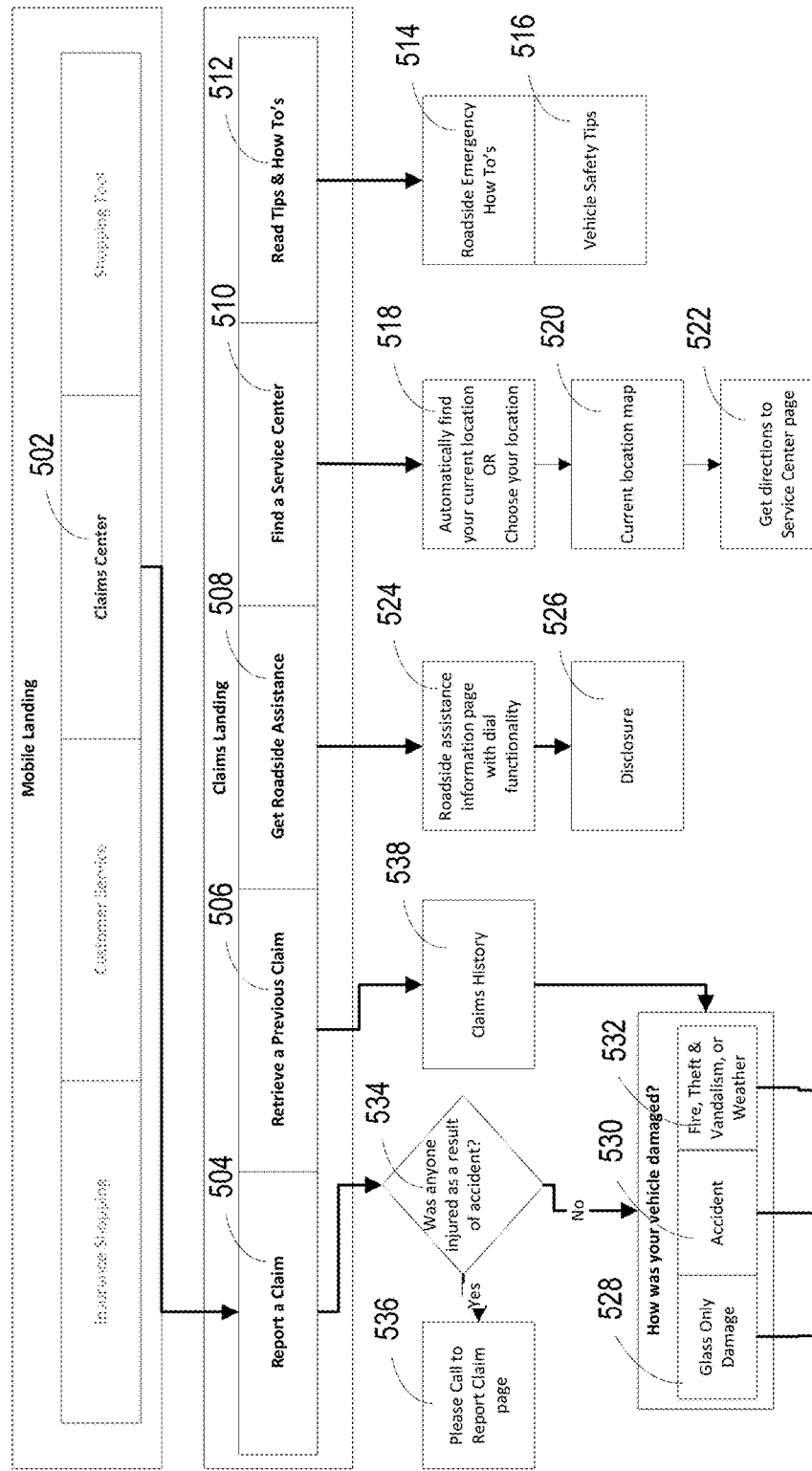
FIG. 5 is an exemplary flow diagram of a claims reporting process.

FIG. 5 illustrates an exemplary menu-driven fact gathering process used to gather claim related information. The exemplary menu driven process 500 may begin when a user enters the claim center 502 that comprises a graphical user interface that presents choices of commands, available options, and hyperlinks for reporting a claim 504, retrieving a previous claims 506 and 538, requesting roadside assistance 508, locating a service center 510, and information on roadside emergencies and vehicle safety 512, 514, and 516. When activated, such as when a user is interested in finding a service center 510, the native claims application client allows a mobile user to specify a location or find his or her current location through the mobile device's sensors and location services resident to and/or accessible to their mobile device 106. Once activated or selected 518, the mobile device 106 makes a request to the insurance servers 116 via interface 114. In response, the mobile device 106 may receive the geographic location of service centers in proximity to the specified or current location of the mobile device 106 that may include graphics and/or scripts 520 from the insurance servers 116 and/or other servers. Some mobile devices 106 map current mobile device 106 locations and service centers in a predetermined proximity or mobile user-defined proximity, and provide the option of receiving turn-by-turn directions to a referred or selected service center 522.

Roadside assistance 508 is also available through some claim landing screens. Information may be provided visually or aurally, and in real time or near real time that may reflect changing conditions or in combination depending on the nature of the request and/or available bandwidth 524 and 526.

When a claim is reported, a mobile user may elect to report a claim 504. In the exemplary menu-driven fact gathering process shown in FIG. 5, the process gathers information about how a vehicle was damaged 528, 530, and 532 asks if injuries occurred 534. If an injury occurred, the mobile device 106 may automatically initiate a telephone call to a call center or direct the mobile user to report the claim by telephone at 536.

Figure 6:
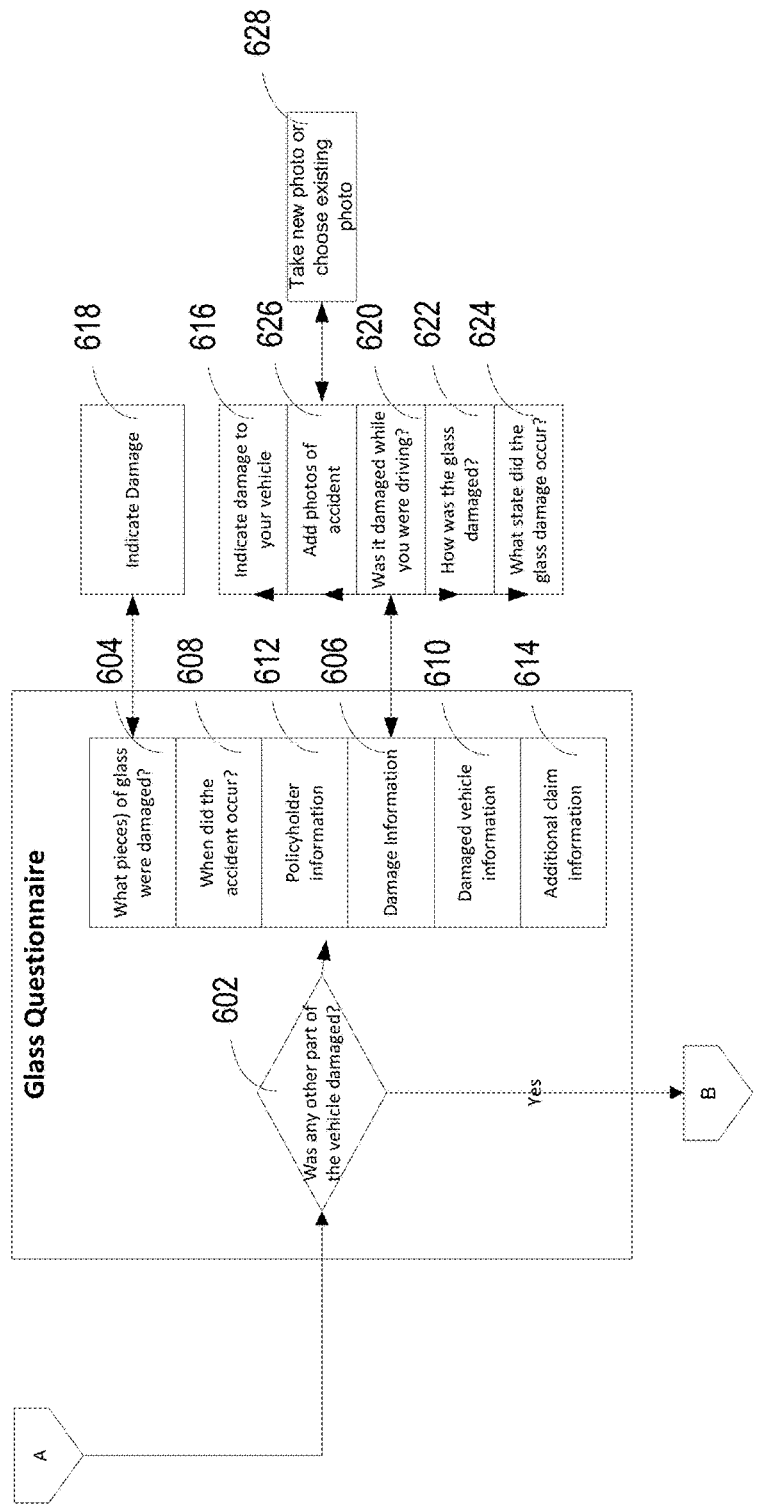
FIG. 6 is an exemplary flow diagram of a claims reporting process for glass.
Figure 7:
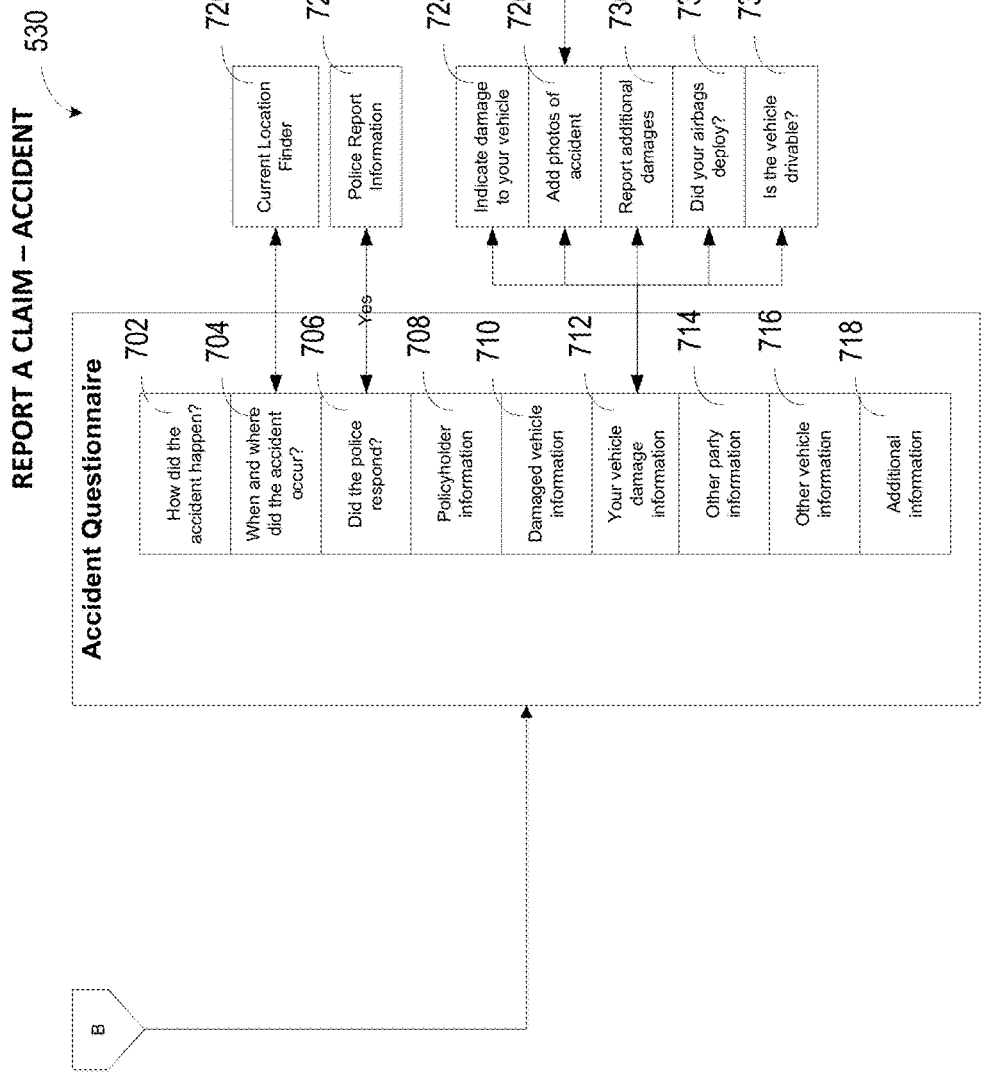
FIG. 7 is an exemplary flow diagram of a claims reporting process for an accident.

Menu choices in some graphical mobile user interfaces allow a mobile user to specify how one or more vehicles are damaged at 528, 530, and 532. If the damage is limited to glass 602 as shown in FIG. 6, information about the glass that was damaged 604, the severity of the glass damage 606, location of the accident 608, vehicle information 610, policyholder information 612, and additional claim information 614 may be gathered via the mobile device 106. Some claim application clients executed on a mobile device 106, such as those shown in FIG. 6, may solicit information through linked connections about damage to the vehicle 616, damaged areas to the glass 618, when the damage occurred 620, how the glass was damaged 622, and in what state the damage occurred in 624. Some menu choices allow mobile users to report damage through the mobile device's 106 camera, optional mobile OCR software, and may execute optional geo-tagging software that may identify not only the severity of the damage through pictures or video, but also the time of day, date and/or geographic location (e.g., longitude, latitude, address, city, state, etc. of where the damage occurred) 626. Other menu choices allow mobile users to select an existing photo or video to report glass damage 628.

When other portions of the vehicle are damaged 602, other menu choices rendered through the graphical mobile user interface of the mobile device 106 allow the mobile user to specify how, when, and where the accident occurred 702 and 704, indicate if the police responded to the accident 706, and allow the mobile user to enter or select policyholder information 708, vehicle damage information 710 and 712, other party information 714 other vehicle information 716, as well as additional information 718. In some systems, location services in the mobile device 106 may automatically identity the location 720. Some systems may access a native police application resident to or accessible to the mobile device 106 to request and submit police report information or details to the insurer's side 102 or rely on the optical camera and mobile OCR software resident to or interfaced to the mobile device 106 and optional geo-tagging software to capture all or a portion of the police report information 722. Other menu choices, such as those shown in FIG. 7, may solicit or receive information (e.g., in the form of text, photos, video, etc.) about the state of the claimant's vehicle, damage to the claimant's vehicle and the drivability of the vehicle 720-734.

Figure 8:
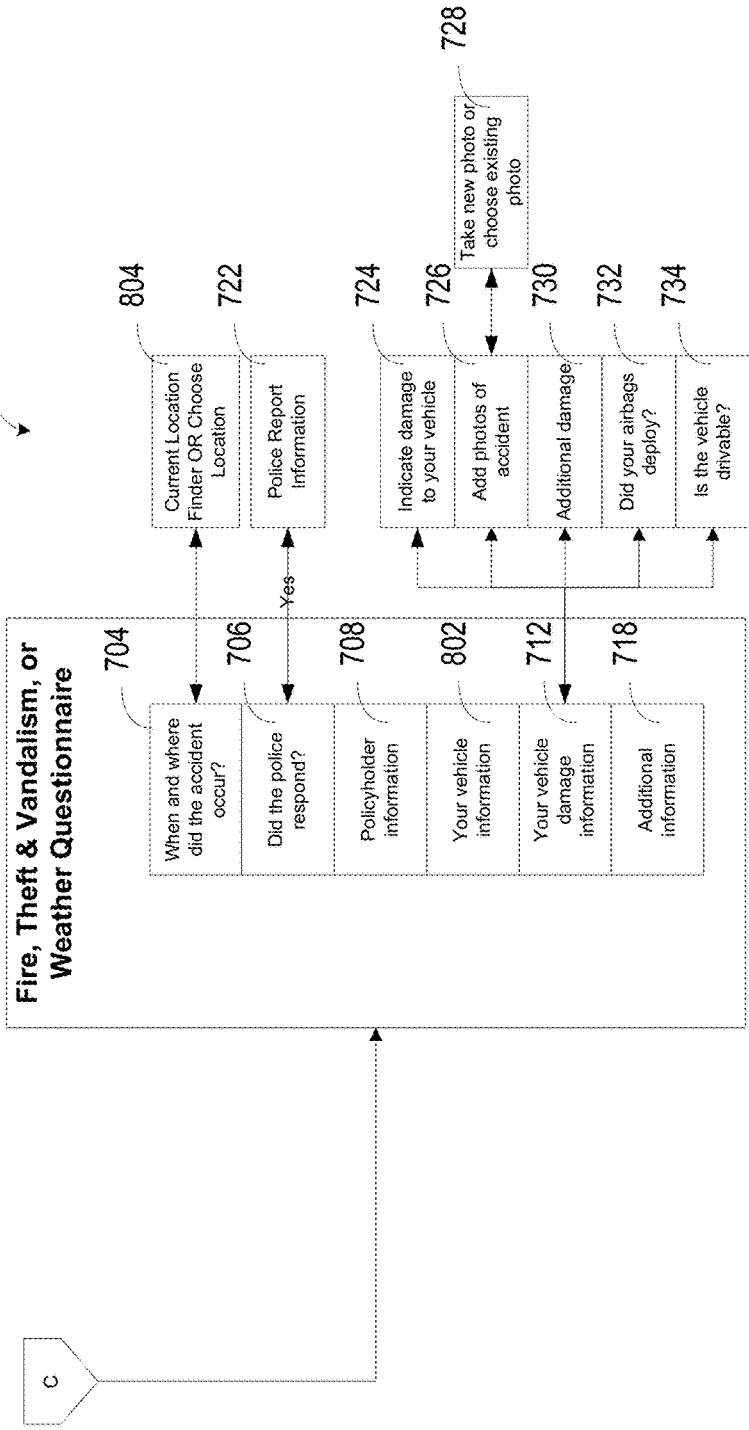
FIG. 8 is an exemplary flow diagram of a claims reporting process for fire, theft, vandalism, or weather.

Information about fire, theft, vandalism, or weather may also be solicited through menu-driven choices (or in the alternative, a command line interface) rendered on the mobile device 106 as shown in FIG. 8. The interface allows the mobile user to indicate when, and where, the accident occurred 704, indicate if the police responded to the claim 706, and allow the mobile user to enter or select policyholder information 708, vehicle information 802 and 712 and enter additional information 718. In some systems, location services in the mobile device 106 may automatically identify the location, or an intermediate menu allows a mobile user to select a location 804. Some systems access the native police application resident to or accessible to the mobile device 106 to request and submit police report information or details to the insurer's side 102 or rely on the optical camera and optional mobile OCR software resident to or interfaced to the mobile device 106 and optional geo-tagging software to capture all or a portion of the police report information 722. Other menu choices, such as those shown in FIG. 8, may solicit or receive information (e.g., in the form of text, photos, video, etc.) about the state of the claimant's vehicle, damage to the claimant's vehicle and the drivability of the vehicle 722-734.

Figure 9:
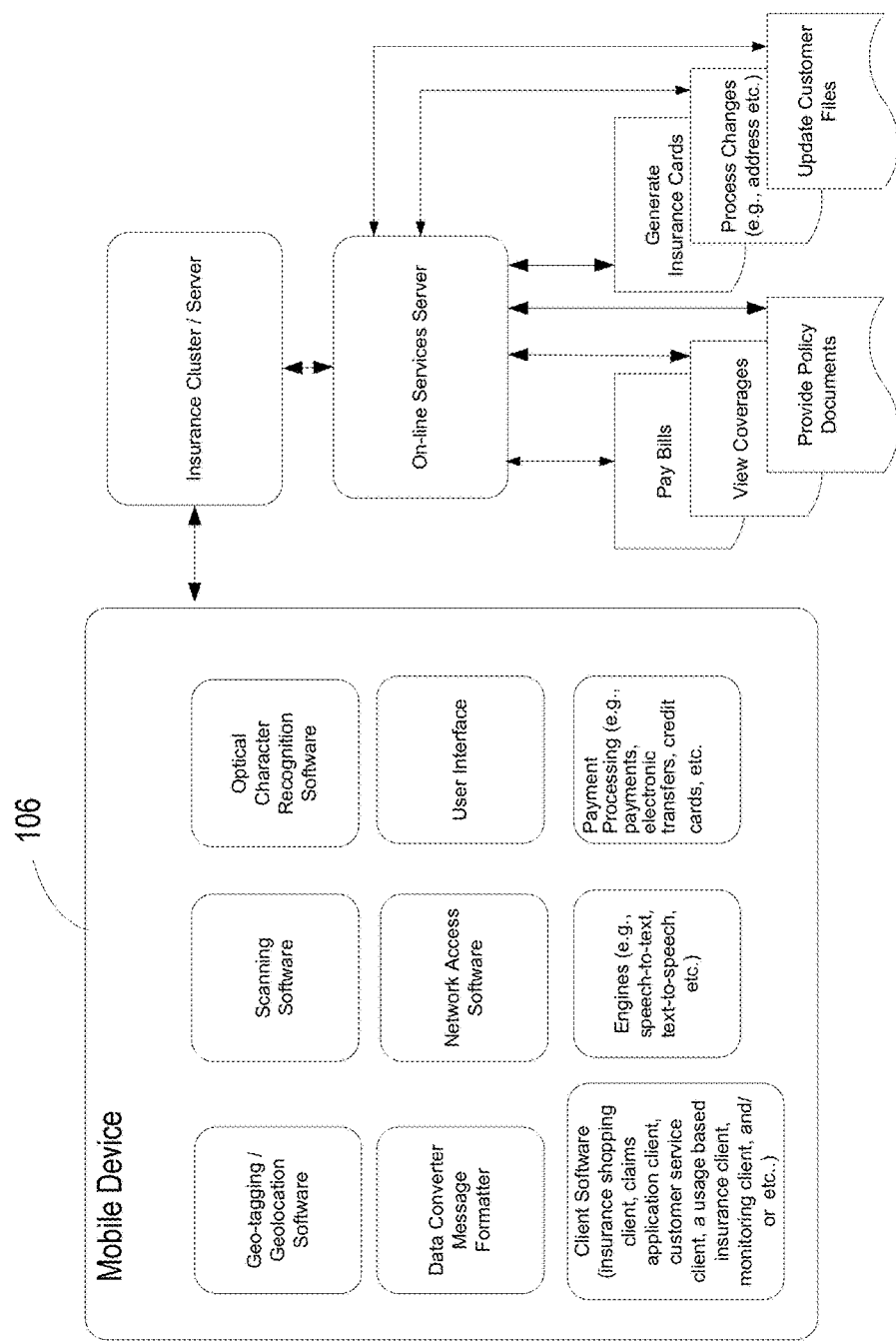
FIG. 9 is a block diagram of an exemplary mobile client device in communication with an on-line services client server(s) or server cluster.

A native customer service client shown in FIG. 9 may also be linked to the native application clients described herein, linked or hyperlinked to the native application clients described herein or other native application clients or web applications, or may comprise a separate standalone native application. Through communication with one or more of the insurance servers 116 and/or on-line services server(s) 124 shown in FIG. 1, mobile users may view and update some or all existing insurance policy information, parameters, or attributes thereof. The native customer service client may include a retrieval object that may locate and retrieve information requested by a mobile policyholder from insurance server(s) 116 and/or on-line services server(s) 124 and displays the information to the policyholder via interface 114 and mobile device's display. A mobile-friendly interface (e.g., a toolbar, dialog box, other graphical user interface, or other application) may guide the mobile user through various mobile application functions that are rendered through the execution and processing of billing objects, payment objects (e.g., enable payment and or real-time or delayed verification via a credit card, on-line check, electronic fund transfers, etc. at the mobile device 106), insurance policy objects (e.g., enables the viewing of coverages, viewing of policy documents, etc.) state specific (e.g., territories such as Ohio, Wisconsin, etc.) contract information objects, quoting an endorsement for vehicle replacement objects, address and/or other demographic change objects (e.g., process insurance policy changes, update insurance customer's electronic files, update prospect electronic files, etc.). The customer service client may display the premium amount and variance on the mobile device 106 and update the mobile user's files on the insurer's side 102 at the mobile customer's request, without need for personal handling (or any handling for that matter) by an individual representative of the insurer or an independent insurance agent. Information transmitted to the mobile customer may be specific to that customer's existing insurance policy and may be maintained and transferred/viewed via a secure interface 114, secure insurance servers 116, secure clusters, etc. to maintain exclusive personal confidentiality between the mobile user and insurer (e.g., it may exclude access to others who are not the mobile user such as a prospect/insured and the insurer). Non-confidential information may also be provided through unsecure interfaces, networks, and servers. Some native customer service clients provide on-device viewing and updating of the mobile user's existing information and facilitate real-time updating of some or all of the insured's insurance policy parameters and provide functionality that implements policy changes on-request (e.g., in real-time, after minimal delay, etc.). Like some native claims application clients, some native customer service clients also support the dynamic or real-time rendering of current up to the minute mobile insurance identification cards or mobile insurance information cards (e.g., insurance cards) that may identify the policy number, coverage period, names of the insureds, agent(s) (if applicable), and a description of the insured item (e.g., a vehicle description) on demand. Such real-time mobile insurance identification cards or mobile insurance information cards may discourage or prevent fraud by further ensuring the integrity of the rendered information.

Figure 10:
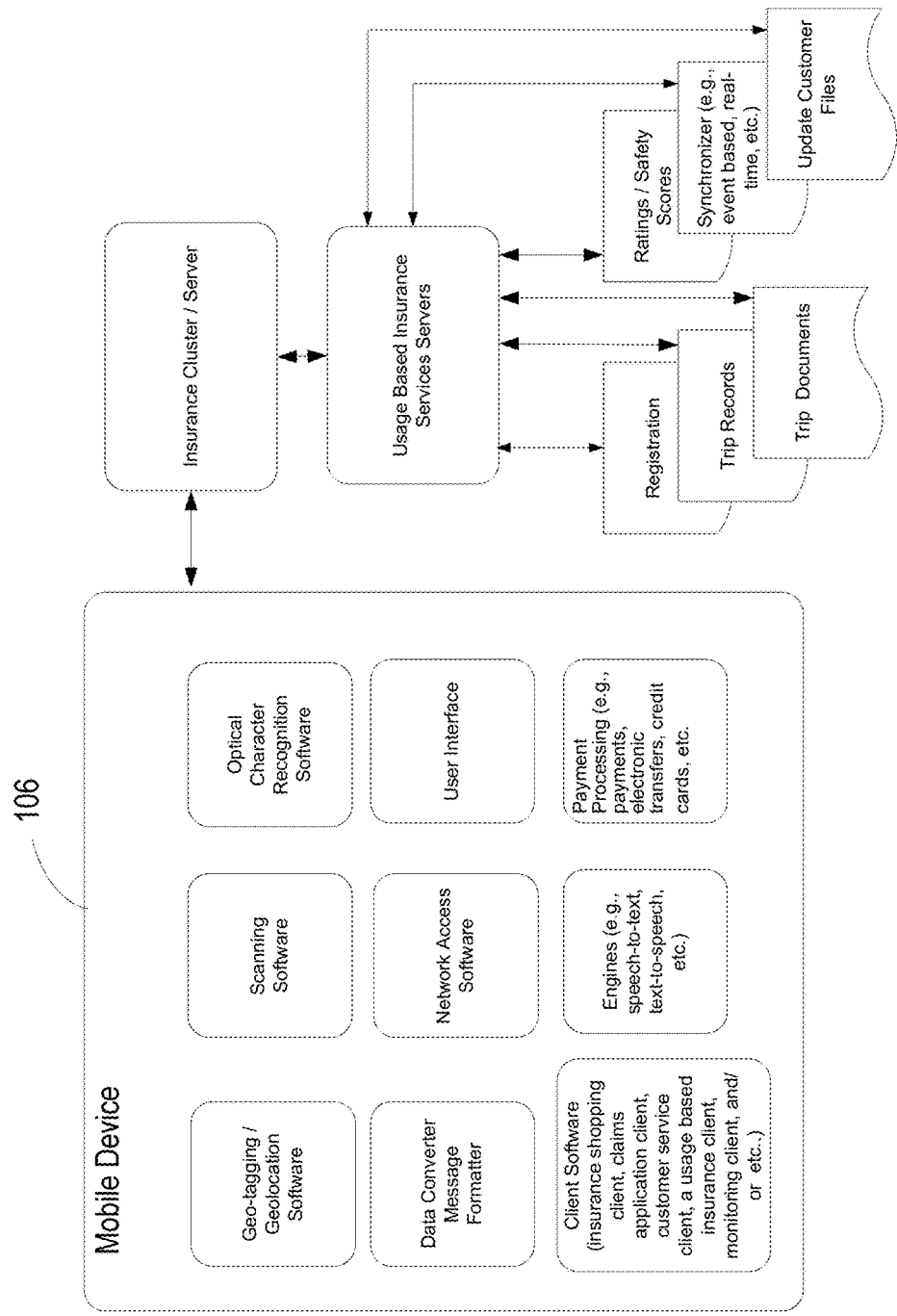
FIG. 10 is a block diagram of an exemplary mobile client device in communication with usage based insurance services server(s) or server cluster.

A usage based insurance client shown in FIG. 10 may also be linked or may be a unitary part of one or more of the native application clients described herein, linked or hyperlinked to the native application clients described herein or another native application or Web application, or may comprise a separate standalone native application. The usage based insurance client may monitor and record some or all of the outputs of sensors that are integrated within or are a unitary part of the mobile device 106 to assess a level of risk or determine a price or cost of insurance (e.g., an insurance premium, an insurance deductible, etc.), or a discount to a price or cost of insurance and/or a surcharge to a price or cost of insurance. Through a personal area network that may include a high level of security, such as a Bluetooth® network, some mobile devices 106 may also monitor, or in the alternative exclusively monitor one, two, or more in-vehicle operating sensors (e.g., physically or wirelessly linked to a physical or virtual vehicle data bus). The data may be transmitted from in-vehicle OEM (Original Equipment Manufacturer) processors that manage powertrain, safety, entertainment, comfort, or ancillary in-vehicle and out of vehicle operations, etc. Such data elements may be communicated directly to the mobile device 106 (e.g., from the in-vehicle sensors), or from the in-vehicle OEM or out-of-vehicle processor(s) through a physical or wireless network that may interface an in-vehicle data bus or one or more in-vehicle processors.

The mobile device 106 may detect and synchronously or asynchronously monitor and store (locally on the mobile device side 104, the insurer's back end 102 and/or on-line cloud storage resources 108) data or output generated by its own or interfaced sensors (such as in vehicle-sensors) that may include any one or any combination of devices that detect and/or measure something such as: miles driven; types of roads driven on via the location services in the vehicle or mobile device 106 (high risk vs. low risk) and third party databases (such as those available through SKYHOOK located in Boston, Mass.); speeds driven, safety equipment used, such as seat belt and turn signals, time of day, week, month, date, driven; rate of acceleration, rate of braking (or deceleration), observation of traffic signs (signals); traffic conditions (high congestion vs. low congestion); road conditions; acceleration events; deceleration events; force/lateral acceleration or characteristics that indicate a hard turning maneuver; temporal characteristics (e.g., period of time an ignition is active or internal power bus is sustained), Revolutions Per Minute or RPM, transmission setting (Park, Drive, Gear, Neutral, etc.), throttle position, engine coolant temperature, intake air temperature, barometric pressure, manifold absolute pressure, oxygen sensor, coolant sensor; entertainment status (e.g., visual or audio systems integrated or interfaced to vehicle); brake light on, turn signal indicator, headlamps on, hazard lights on, back-up lights on, parking lights on, wipers on, doors locked, key in ignition, key in door lock, horn applied, battery voltage, Information from body sensors, airbag deployment, ABS application, level of fuel in tank, brakes applied, accelerator applied, radio station tuned in, seat belt on or off, door open, tail gate open, odometer reading, cruise control engaged, anti-theft disable, occupant in seat, occupant weight, accelerator/brake pedal depression (e.g., measured in degrees or force applied) accessories (e.g., mirror settings, dash light status, etc.,) vehicle location (e.g., navigation related information), date, time (such as, Greenwich Mean Time), vehicle direction, IVHS data sources (e.g., wide-area Intelligent Vehicle Highway Systems), pitch and/or roll, relative distance to other objects, vehicle in skid, wheels in spin, closing speed on vehicle in front, closing speed of vehicle in rear, closing speed of vehicle to side (right or left), space to side of vehicle occupied, space to rear of vehicle occupied, space to front of vehicle occupied, lateral acceleration, rotation of vehicle (e.g., sudden), loss of tire pressure (e.g., sudden); driver identification (e.g., through voice recognition, code, fingerprint, retinal, or other recognition); distance traveled; vehicle speed in excess of speed limit; observation of traffic signals and signs; relative braking or acceleration or deceleration events; road conditions; traffic conditions; vehicle position. Ignition On/Off (e.g., may measure length of time an ignition switch is activated); acceleration thresholds, velocity thresholds; elapsed time; battery voltage levels; vehicle operating conditions (e.g., system health), traction, location and geo-fencing; remote activation; vehicle motion, clutch engagement or disengagement; power bus activation (may measure the length of time power is sourced to a bus or a conductor), seat belt use, vehicle orientation, etc.

Some usage based insurance objects that may in part comprise the native usage based insurance client may store usage based data on the insurer's side 102 through the insurance servers 116 or clusters or usage based insurance services server(s) 124 or clusters synchronously or asynchronously. The insurer side 102 may also store data in memory accessible to one or more database servers 110. The insurer side 102 may process the data exclusively or with other data previously entered into or accessible to the insurer's side 102 or insurance servers 116 or clusters or usage based insurance services server(s) 124 to render one or more insurance ratings (e.g., a position assigned on an insurance scale), safety ratings, insurance scores, and/or driver scores. A safety score may comprise a value computed by one or more insurance companies or on behalf of one or more insurance companies that represent, or represents in part, the probability of an insured filing a claim during the insured's insurance coverage period. The safety score may be based on usage based driving data exclusively in some systems, and in other systems, may be based on a combination of data that includes a driver's usage based driving data and one or more quantifiable or measurable parameters of that driver. A measurable parameter may comprise an insured's or claimant's credit rating, for example.

In alternative systems, the mobile device 106 may process the monitored data elements to derive one or more insurance ratings, safety ratings, insurance scores, and/or driver scores that may be retained in the mobile device's memory or in the on-line cloud storage resources 108. The data may be uploaded through the interface 114 and a wireless and/or cellular network, and in some instances, may be rendered on the mobile device 106 display that may display or render the data locally or may transmit the data to a remote node or destination. In some systems, mobile device 106 data or vehicle provided data is stored and transmitted in response to the completion of a vehicle event or mobile device 106 event (e.g., an event may be the initiation or completion of a significant occurrence). When an event occurs, some mobile devices 106 may transmit data upon the occurrence of the event. For example, when an airbag deploys, data may be delivered to the insurance servers 116 as the airbag is deployed (e.g., in real-time) or after a minimal delay. The insurer servers 116 may communicate or attempt to communicate with the mobile device 106 when the data is received or upon the occurrence of the airbag deployment (e.g., the event). If communication between the insurance servers 116 or clusters fails, the insurance servers 116 or the mobile device 106 may contact or initiate contact with emergency medical and/or police services automatically, and in some systems, automatically transmit the location (e.g., latitude and longitude), time of day, date, and other relevant data about the event to the emergency medical and/or police services.

FIGS. 11-16 illustrate exemplary screens that the usage based insurance objects resident to the mobile device 106 may render. Some mobile interfaces (e.g., a toolbar, dialog box, other graphical user interface, or other application) may guide the mobile user through various mobile application functions that are rendered through the execution and processing of registration objects that include or support a quick-fill object that may automatically prefill or suggest data to prefill forms or dialog boxes and may list options in which mobile users can make selections, usage based monitoring objects that track actual driving behaviors, display objects, and mobile utility objects that may upload data or trips and remove data from the mobile device 106.

Figure 11:
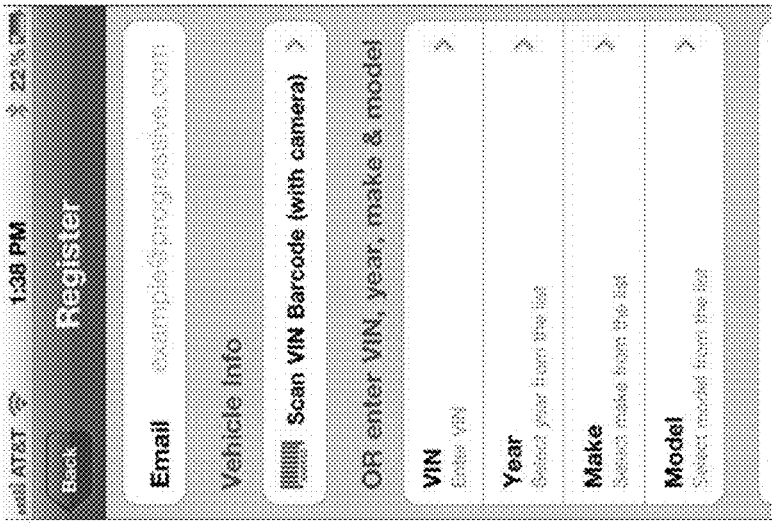
FIG. 11 are exemplary opening screen and registration screen that may be rendered on a mobile device.
Figure 11:
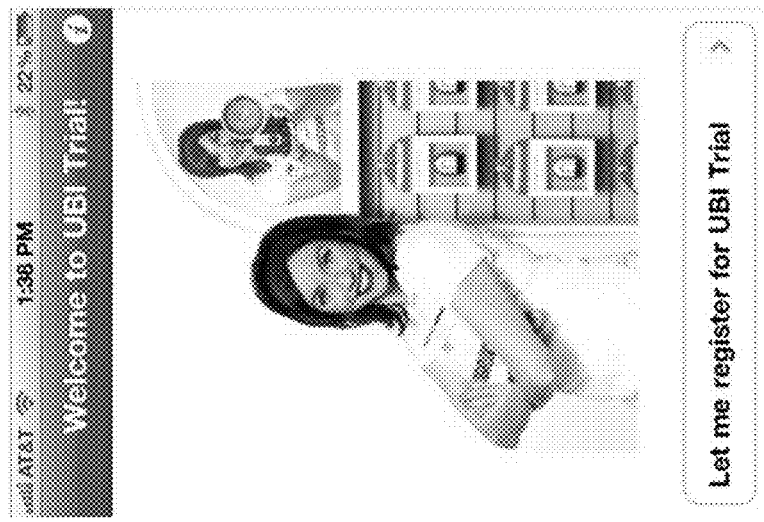
Figure 12:
FIG. 12 are exemplary screens of a vehicle identification number bar code and the rendering of a scan through the mobile device.

The registration objects that may render the exemplary screens of FIGS. 11 and 12 may gather the information needed to monitor a driver, such as vehicle data (that may include year, make, model/sub-model, vehicle identification number or VIN, for example) through mobile templates or dialog boxes resident to the mobile device 106. The information may be gathered or supplemented automatically through one, two, or more sensors built into the mobile device. Some insurance shopping client objects configure an optical camera of the mobile device 106 into an optical scanner. Mobile OCR and optional geo-tagging software associated with the usage based insurance objects resident to the mobile device 106 (or in the alternative, provided though a metered service over a network, like the Internet, through cloud computing resources 108, or resident to the insurer's side 102) may translate the identification characters (or vertical bars of differing widths if the scanning a bar code, such as a Code 39 bar code associated with a VIN, Q.R. Codes®, etc.), and in some systems the geographical location of the VIN, into a computer/mobile device readable text that allows a quick-fill object to prefill or suggest data to prefill one or more mobile templates or dialog boxes. In the alternative, the data may be directly transmitted to the insurer's side 102. Some registration objects may gather the information through top-level and/or intermediary menus that provide a list of options when the mobile user makes a selection.

Some registration objects may communicate directly with the vehicle that may be the focus of the monitoring. Through a personal area network that may include a high level of security, such as a Bluetooth® network (e.g., that may encompass the wireless specification defined by IEEE 802.15, 802.15.4 (TG4), 802.15.3 (TG3), or other standards), for example, the mobile device 106 may communicate directly with the vehicle to capture the vehicle's VIN, and in some systems, supplement the VIN identification with personal information and/or usage based information resident to the vehicle's powertrain control module, body control module, entertainment and comfort module, and/or other in-vehicle system and/or other data descriptive or associated with the vehicle.

Figure 13:
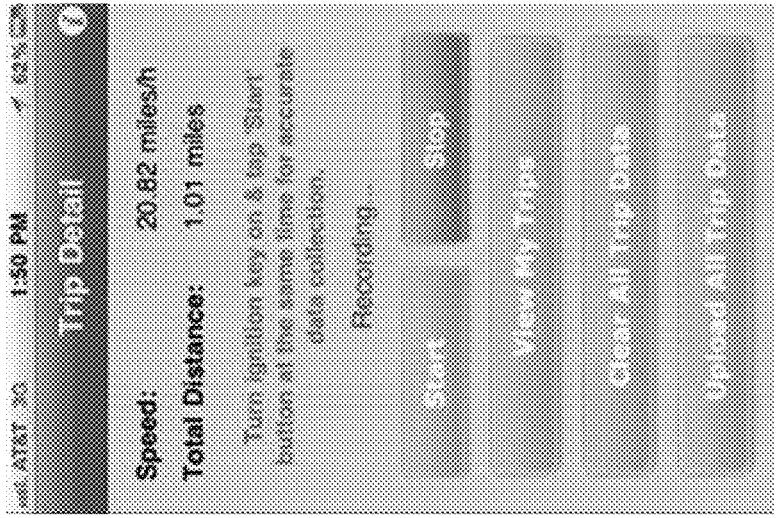
FIG. 13 are exemplary landing and trip data screens that may be recorded on the mobile device.
Figure 13:
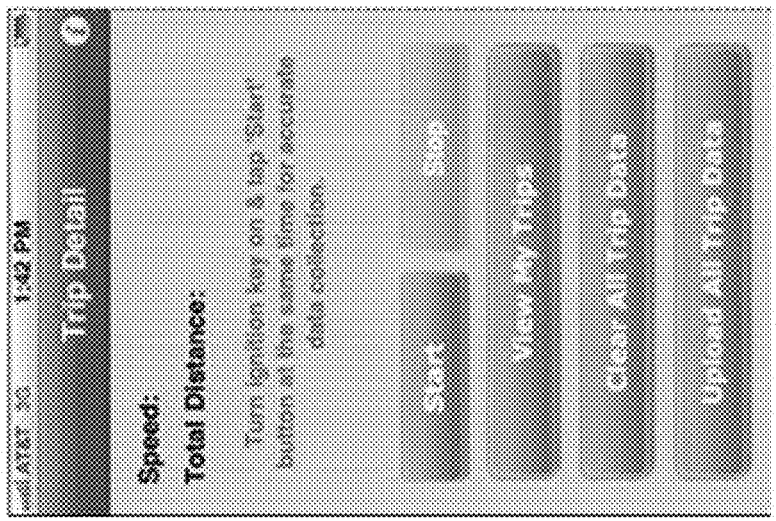

The landing screen and trip data recorded shown in FIG. 13 may be rendered through the usage based monitoring objects that track actual driving behaviors and display objects that generate the images or video sent to the mobile device 106 display. As shown through the exemplary screens, data may be stored or processed in relation to a predetermined time period, the occurrence of an event, or a trip. A trip may start when motion is detected (such when the mobile device 106 detects speed or acceleration above a predetermined threshold), in response to a mobile user's voice or manual command, or when a vehicle state changes. Vehicle state changes may occur when a vehicle ignition is turned on, communication occurs on one or more vehicle or in-vehicle buses, vehicle voltage exceeds or falls below a programmable threshold, etc. that may be automatically detected by the mobile device's 106 via a communication link with the vehicle. A trip may end when motion ends, vehicle state changes (e.g., when the ignition of the vehicle is turned off or when data, such as speed data, is not detected or no communication occurs on one or more vehicle or in-vehicle buses within a programmable time period, or vehicle voltage falls below a programmable threshold, or in response to an insurer's, mobile user's or other's physical, aural, or gesture command). In alternative mobile devices 106, one or more combinations of these conditions may identify trips (e.g., a beginning and/or end of a trip).

Figure 14:
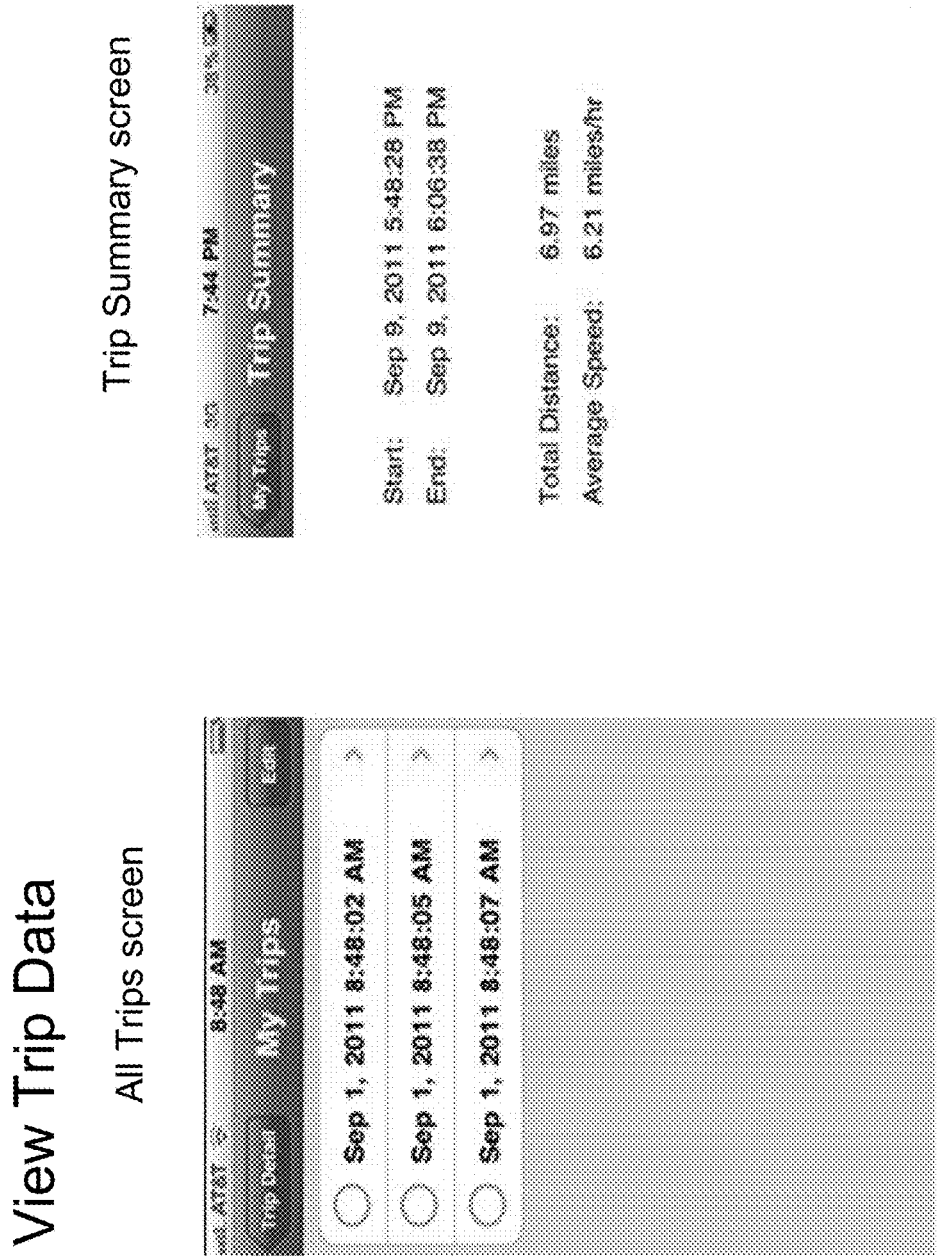
FIG. 14 are exemplary all trip screen and trip summary screen that may be rendered on the mobile device.

In some mobile devices 106, usage based monitoring objects and/or display objects may allow mobile users to review trips as shown in exemplary screens shown in FIG. 14. The content may indicate how the usage based recorded data may affect a prospective and/or retrospective cost of insurance (e.g., a surcharge and/or discount applied to an insurance\premium for a future and/or past insurance period). For example, the usage based monitoring objects and/or display objects may display or aurally convey the mobile recorded data with a message indicating that a projected discount (e.g., a three percent discount) may be available if the data is transmitted to the insurer's side 102 or another service provider's destination. Additionally, or alternatively, the usage based monitoring objects and/or display objects may automatically highlight portions of the monitored data (e.g., alter the appearance of the display or alter the tone, pitch, and or volume of aural conveyance to call attention to them) that may qualify the mobile user for additional discounts or surcharges or highlight driving data that may be subject to a surcharge. These display highlights may be explained through a hyperlink to other screens or audio options that may not be visible or heard by the mobile user until the completion of the message.

In some mobile devices 106, usage based monitoring objects and/or display objects may allow mobile users to review recorded data about one or more aspects of vehicle operation and allow users to compare operational behavior to the operational behavior of others. For instance, a mobile user's recorded data may be compared against an average or aggregate set of data received from other mobile users. Statistical or other comparisons may be made. These comparisons may compare a mobile user's usage based data to an average or aggregate of some or all parties who have uploaded data, an average, or aggregate of data provided by operators with similar demographics or characteristics (e.g., age, sex, location, etc.), an average or aggregate of data provided by parties associated with similar machines (same model car, same model milling machine, same size heat treating furnace, same model tractor or same model combine) or a combination of other classes of data.

Figure 15:
FIG. 15 are exemplary upload all trip data and the upload trip screens that may be rendered on the mobile device.
Figure 16:
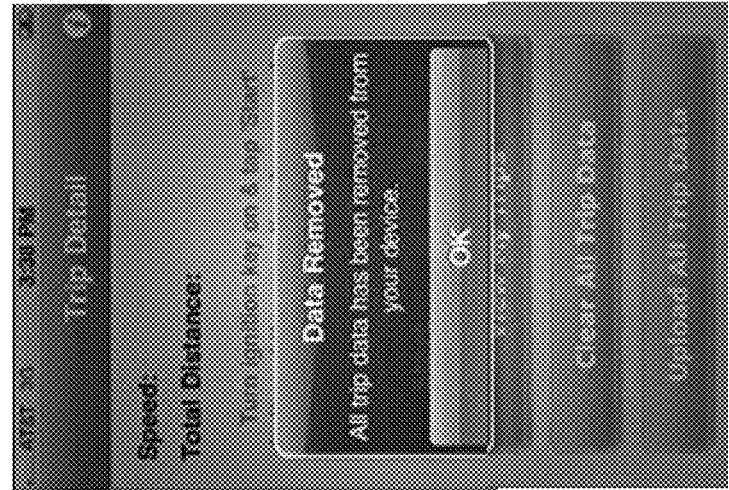
FIG. 16 are exemplary remove individual trips and remove all trip data screens that may be rendered on the mobile device.
Figure 16:
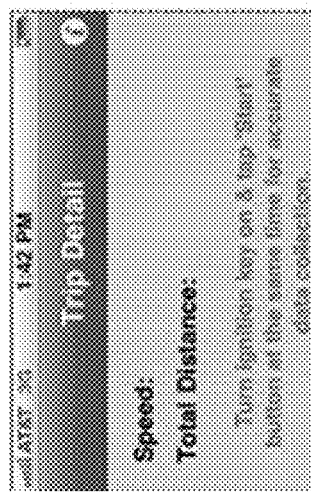
Figure 16:
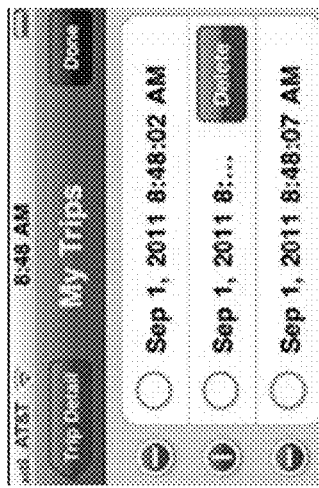

As shown in FIGS. 15 and 16, mobile utility objects resident to the mobile device 106 may enable mobile users to upload data or trips on command or automatically, and remove data from a mobile device 106. A cellular or wireless transceiver within the mobile device 106 may transfer the recorded information, or a copy thereof, from the mobile device 106 to a device or destination, such as those shown on the insurer's side 102. Alternatively, complimentary or backup connections may be made by devices compliant with wireless mesh networks, or public networks such as Wi-Fi (e.g., 802.11b/g/n), or other wireless networking or communication technology through the synchronization objects. Data transfer may occur automatically or in response to mobile user commands. When a transfer occurs, a mobile user may be rewarded with a discount for transmitting the data to a remote destination, such as an insurer's server(s) 116 or cluster. The data may indicate that a mobile user is entitled to an additional premium or deductible discount for some monitored driving behavior and/or subject to a surcharge for other monitored driving behavior. If a mobile user is not an existing insurance customer, an insurance quote may be transmitted to the mobile user through the insurance shopping client resident to the mobile device 106 as described above.

Each of the native application clients described herein may be encompassed within or interface with an insurance agency management native application client resident to the insurance agent's mobile device 106 (with the exception of providing access to data, quotes, applications, etc. that the mobile user and/or insurer designated as confidential between the originator and receiver). Using insurance agency management native application clients, insurance agents may gain access to all of the functions and systems described herein and above and objects that allow insurance agents to access a portion of or the entire insurance agent's book of business, receive mobile insurance management tools that facilitate the management of existing clients and capture of new business, gain access to insurance reports including reports directed to the insurance agent's own clients, manage agent commissions, collaborate with other insurance agents, etc. Other functionality may allow insurance agents to download (from the insurance server(s) 116 and/or other servers) and transmit insurance carrier brochures, links to mobile insurance applications that facilitate faster turnaround and improved quoting and purchasing accuracy, automatic real-time or near real-time insurance rate updates and insurance rate comparisons that may compare insurance plans, insurance premiums, insurance deductibles, and insurance carriers side-by-side.

Some insurance agency management native application clients resident to the insurance agent's mobile device 106 include insurance agent interfaces (e.g., hardware and/or software) that may be preconfigured or allow insurance agents to customize the insurance agent interfaces. A customization may allow more data and/or items to be selected or commands executed without requiring the insurance agents to make multiple or rapid selections and/or activations of programs and/or links. The customizable insurance agent interfaces and other preconfigured user interfaces (that are not exclusive to insurance agents) may be linked to management objects that render reminders such as birthdays, anniversaries, renewal dates, etc. of the party or parties associated with a task and/or data (e.g., an insured's or prospect's data). Some interfaces may automatically connect the insurance agents to their customers, clients, prospects or insurance companies through communication media and/or interactive connections. Some communication and/or connections may include electronic mail and/or text messaging such as a short message (or messaging) service. Some communication and/or connections facilitate access to one, two, three or more social networking Web sites, social media sites, and/or social networking profiles to enhance communication or provide access to other communication channels that provide access to customers, users, and/or insurance prospects to support or facilitate some or all of the processes and systems described herein. The communication and/or connection hardware and/or software may process presence information on the mobile network and in some applications presence information on social networking Web sites, social media sites, etc. The presence information may comprise a status indicator that conveys the ability and willingness of a potential communication with a desired insurance customer, user, and/or prospect. Some communication and/or connection hardware may be programmed and/or configured to process presence information that may identify personal availability (e.g., such as processing personal availability records or presentity data) and/or may be programmed and/or configured to notify one or more insurance agents when a desired insurance customer's, user's, and/or prospect's presence state changes (e.g., a desired insurance customer, user, or prospect becomes available) that may also indicate the insurance customer, user, and/or prospect's willingness to communicate.

Each of the systems and applications described above may provide real-time alerts for mobile users and insurance agents. The alert may comprise a short message service, an email feature, tactile feedback, or other functionality that sends voice, graphics, and/or textual messages (e.g., audio, visual, vibration) to mobile insurance customers and insurance agents. Some real-time alerts are accessible through a native application client object or through a Web browser via a Web page that may display the status of the issue that is being monitored. For example, if an insurance claim is being monitored, the alert may be accompanied by claim details, and/or contact to information. In some native insurance application clients, the mobile users may monitor claims through one or more screens and have the ability to change how, when, and/or where the mobile user is to be notified. The mobile screens may provide access to information on mobile user policies, policy payments, documents, policy changes (made or may be made), insurance claims, and information about the insured item.

Each of the systems and native application clients illustrated or described may linked to a native mobile user monitoring client. The native mobile monitoring client may supplement the information captured by the native application clients by gathering additional information about the mobile user. The native mobile monitoring client may enable the mobile device 106 to access or record the mobile user's activities, such as the time spent on the telephone during an insured activity (e.g., while driving), the number of messages processed through the mobile device 106 during an insured activity, Websites visited through the mobile device 106 during the insured activity, software run on the mobile device 106 during the insured activity, emails and messages sent through the mobile device 106 during an insured activity, etc.

While each of the native application clients and objects may stand alone or may be encompassed within the other systems and applications, native application clients and objects may also be linked or comprise a unitary part of one native application client on the mobile device 106. Other alternate systems may include any combinations of structure and functions described above or shown in one or more or each of the figures. These systems or methods are formed from any combination of structure and function described.

Some systems may include devices such as servers that comprise computers and/or programs stored on a non-transitory media that respond to commands, events, actions, and/or requests. When such devices are responsive to such commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action "(i.e., the device's response) to . . . " merely follow another action.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

We claim:
1. A mobile insurance system comprising:
a wireless communication interface configured to connect to mobile client devices;
an insurance server cluster comprising a group of independent network servers that operate and appear to the mobile client devices as if the group of independent network servers were a single server computer;
an adaptive transmission controller in communication with the insurance server cluster that processes mobile content in multiple mobile versions optimized to screen sizes, display resolutions, operating systems, and an availability of a plug-in on the mobile client devices;
a quoting server comprising an insurance cluster programmed to enable the mobile client devices to render comparisons of insurance plans, insurance policy rates, or insurance carriers on one or more of the mobile client devices;
a claims services server resident to the insurance cluster further programmed to respond to a claim request from a native claims application client resident to one of the mobile client devices from a user and
an on-line services server resident to the insurance cluster programmed to respond to an on-line request from a native customer service client resident to the one of the mobile client devices by transmitting a screen that renders a display of an existing insurance policy and renders updates to an existing insurance policy parameter;
where the insurance server cluster is configured to respond to native application clients resident to one or more of the mobile client devices and is programmed to execute code stored in a non-transitory media that renders insurance quoting services, insurance claims services, on-line insurance policy services, or usage based insurance services and
where the adaptive transmission controller is configured to deliver a plurality of adaptive bit rate outputs that deliver a plurality of resolutions and output formats that target the mobile client devices.

2. The mobile insurance system of claim 1 where the quoting server is programmed to respond to a quoting request from a native insurance shopping client resident to one of the mobile client devices with an insurance quote customized to a user.

3. The mobile insurance system of claim 2 where the native insurance shopping client is not executed through a Web browser.

4. The mobile insurance system of claim 1 where the quoting server renders one or more rate quote comparisons.

5. The mobile insurance system of claim 1 where the claims server comprising a computer programmed to respond to the claim request.

6. The mobile insurance system of claim 5 where the response to the claim request comprises a determination whether to issue a command that disburse a payment to a user.

7. The mobile insurance system of claim 5 where the claims server receives information in the form of a photograph.

8. The mobile insurance system of claim 1 where the insurance server cluster renders mobile insurance identification cards that identify an insurance policy number, coverage period, and names of insureds.

9. The mobile insurance system of claim 1 where the on-line services server's response comprises a transmission of data that renders the screen.

10. The mobile insurance system of claim 1 where the on-line services server comprises a computer.

11. The mobile insurance system of claim 1 further comprising a usage based insurance server comprising a computer programmed to respond to a request from a native vehicle usage based insurance client by transmitting a safety score.

12. The mobile insurance system of claim 11 where the safety score comprises a probability that a user will be involved in an insurance claim during the user's insurance coverage period.

13. The mobile insurance system of claim 1 further comprising a usage based insurance server resident to the insurance cluster programmed to respond to a usage based request by transmitting a safety score.

14. A method of electronically communicating with a plurality of mobile client devices, comprising:
rendering a wireless communication interface configured to connect to mobile client devices;
rendering a group of independent network servers that operate and appear to the mobile client devices as if the group of independent network servers were a single server computer,
processing mobile content in multiple mobile versions optimized to screen sizes, display resolutions, operating systems, and an availability of a plug-in on the mobile client devices through an adaptive transmission controller;
enabling the mobile client devices to render comparisons of insurance plans, insurance policy rates, or insurance carriers on one or more of the mobile client devices through a quoting server resident to the group of independent network servers,
responding to a claim request from a native claims application client resident to one of the mobile client devices to a user of the one of the mobile devices through a claims services server resident to the group of independent network servers; and
responding to an on-line request from a native customer service client resident to the one of the mobile client devices by transmitting a screen that renders a display of an existing insurance policy and renders updates to an existing insurance policy parameter through an on-line services server resident to the group of independent network servers;
where the group of independent network servers is configured to respond to native application clients resident to one or more of the mobile client devices and is programmed to execute code stored in a non-transitory media that renders insurance quoting services, insurance claims services, on-line insurance policy services, or usage based insurance services and
where the adaptive transmission controller is configured to deliver a plurality of adaptive bit rate outputs that deliver a plurality of resolutions and output formats that target the mobile client devices.

15. The method of claim 14 further comprising receiving identifying information comprising textual data generated from information extracted from image data captured by an optical scanner that is a unitary part of one or more of the mobile client devices.

16. The method of claim 14 further comprising receiving geo-location data corresponding to a current location of one or more of the mobile client devices from a native geotagging application resident to one or more of the mobile client device; and verifying an address associated with the user identifying information is within a predefined distance of the current location of the one or more mobile client devices.

17. The method of claim 15 where the image data corresponding to an insurable property item comprises a vehicle identification number.

18. The method of claim 14 further comprising identifying a vehicle identification number by one or more of the mobile client devices that are in direct communication with a vehicle's powertrain control module through a local wireless network.

19. The method of claim 14 further comprising identifying a model of a vehicle, identifying a make of the vehicle, and identifying a year of the vehicle by the mobile client device communicating directly with a control module through a local wireless network.

20. The method of claim 14 further comprising authenticating the user at one or more of the mobile client devices through a mobile-side facial recognition native application and transmitting an insurable request message to an insurance server across a mesh based wireless network.

21. A mobile insurance system comprising:
a wireless communication interface configured to connect to mobile client devices,
an insurance server cluster comprising a group of independent network servers that operate and appear to the mobile client devices as if the group of independent network servers were a single server computer;
an adaptive transmission controller in communication with the insurance server cluster that processes mobile content in multiple mobile versions optimized to screen sizes, display resolutions, operating systems, and an availability of a plug-in on the mobile client devices;
where the insurance server cluster is configured to respond to native application clients resident to one or more of the mobile client devices and is programmed to execute code stored in a non-transitory media that renders insurance quoting services, insurance claims services, on-line insurance policy services, or usage based insurance services;
a quoting server comprising an insurance cluster programmed to enable the mobile client devices to render comparisons of insurance plans, insurance policy rates, or insurance carriers on a side-by-side display that is a unitary part of one of the mobile client devices;
a claims services server resident to the insurance cluster further programmed to respond to a claim request from a native claims application client resident to one of the mobile client devices by making a determination for a disbursement payment to a user of the one of the mobile client devices; and
an on-line services server resident to the insurance cluster programmed to respond to an on-line request from a native customer service client resident to the one of the mobile client devices by transmitting a screen that renders a display of an existing insurance policy and renders updates to an existing insurance policy parameter.

22. The mobile insurance system of claim 21 where the response to the on-line request comprises a transmission of screen data that renders a display of coverages, deductibles, and rates of multiple insurance policies on one mobile screen.

23. The mobile insurance system of claim 21 where the on-line services server adjusts data that is measured on different scales to a common scale, the data is part of a screen data prior to adjustment to ensure a consistent comparison.

24. The mobile insurance system of claim 21 further comprising a usage based insurance server comprising a computer programmed to respond to a usage based request from a native vehicle usage based insurance client.

* * * * *